(12) United States Patent
Holmes et al.

(10) Patent No.: US 11,164,357 B2
(45) Date of Patent: *Nov. 2, 2021

(54) IN-FLIGHT ADAPTIVE FOVEATED RENDERING

(71) Applicant: QUALCOMM Incorporated, San Diego, CA (US)

(72) Inventors: Samuel Benjamin Holmes, Sterling, MA (US); Tate Hornbeck, Cambridge, MA (US); Robert Vanreenen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,752

(22) Filed: Mar. 30, 2020

(65) Prior Publication Data
US 2020/0226813 A1 Jul. 16, 2020

Related U.S. Application Data

(63) Continuation of application No. 16/130,910, filed on Sep. 13, 2018, now Pat. No. 10,650,568.

(51) Int. Cl.
G06T 15/00 (2011.01)
G06F 3/01 (2006.01)
G06T 1/20 (2006.01)

(52) U.S. Cl.
CPC .......... G06T 15/005 (2013.01); G06F 3/013 (2013.01); G06T 1/20 (2013.01)

(58) Field of Classification Search
CPC .......... G06T 15/005; G06T 1/20; G06F 3/013
See application file for complete search history.

(56) References Cited

U.S. PATENT DOCUMENTS

| 9,171,350 | B2 | 10/2015 | Diard |
| 9,280,836 | B1 | 3/2016 | Craik |
| 10,650,568 | B2 | 5/2020 | Holmes et al. |
| 2015/0279067 | A1 | 10/2015 | Yuda |
| 2016/0275916 | A1 | 9/2016 | Glen et al. |
| 2017/0045941 | A1 | 2/2017 | Tokubo et al. |
| 2017/0169602 | A1 | 6/2017 | Blackmon et al. |
| 2017/0200308 | A1 | 7/2017 | Nguyen et al. |
| 2017/0316601 | A1 | 11/2017 | Kakarlapudi et al. |
| 2018/0068640 | A1 | 3/2018 | Martin |

(Continued)

OTHER PUBLICATIONS

International Search Report and Written Opinion—PCT/US2019/049924—ISA/EPO—dated Dec. 6, 2019.

*Primary Examiner* — Haixia Du
(74) *Attorney, Agent, or Firm* — Qualcomm Incorporated

(57) ABSTRACT

A method, a computer-readable medium, and an apparatus are provided. The apparatus may be configured to receive information indicative of a fovea region. The apparatus may be configured to identify, based on the information indicative of the fovea region, high priority bins and low priority bins. The apparatus may be configured to determine a rendering time allotment for the frame. The apparatus may be configured to determine that the rendering time allotment for the frame will be exceeded, based on an amount of time used to render the high priority bins and the low priority bins. The apparatus may be configured to render, based on the determination that the rendering time allotment for the frame will be exceeded, at least one of the low priority bins at a first quality instead of a second quality.

24 Claims, 13 Drawing Sheets

(56) References Cited

U.S. PATENT DOCUMENTS

2018/0160160 A1 6/2018 Swaminathan
2018/0197323 A1 7/2018 Howson et al.
2020/0090396 A1 3/2020 Holmes et al.

REPRESENTS FRAME

REPRESENTS BIN

REPRESENTS FOVEA REGION

REPRESENTS FRAME

REPRESENTS BIN

REPRESENTS FOVEA REGION

REPRESENTS FRAME

REPRESENTS BIN

REPRESENTS FOVEA REGION

REPRESENTS FRAME

REPRESENTS BIN

REPRESENTS FOVEA REGION

IN-FLIGHT ADAPTIVE FOVEATED RENDERING

This application is a continuation and claims the benefit of U.S. patent application Ser. No. 16/130,910, filed Sep. 13, 2018, the entire contents of which are incorporated herein by reference.

FIELD

The present disclosure generally relates to graphics processing.

BACKGROUND

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes multiple processing stages that operate together to execute graphics processing commands/instructions and output a frame. A central processing unit (CPU) may control the operation of the GPU by issuing one or more graphics processing commands/instructions to the GPU. Modern day CPUs are typically capable of concurrently executing multiple applications, each of which may need to utilize the GPU during execution. A device that provides content for visual presentation on a display generally includes a graphics processing unit (GPU).

A GPU renders a frame of graphical content into a framebuffer for display. This rendered frame may be read from the framebuffer and processed by a display processing unit prior to being displayed. For example, the display processing unit may be configured to perform processing on one or more frames that were rendered for display by the GPU and subsequently output the processed frame to a display. The pipeline that includes the CPU, GPU, and display processing unit may be referred to as a display processing pipeline.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to receive information indicative of a fovea region. The apparatus may be configured to render a frame using bin-based rendering. The apparatus may be configured to divide the frame into a plurality of bins. The apparatus may be configured to identify, based on the information indicative of the fovea region, one or more bins of the plurality of bins as high priority bins. The apparatus may be configured to identify, based on the information indicative of the fovea region, one or more bins of the plurality of bins as low priority bins. The apparatus may be configured to render the one or more high priority bins before rendering the one or more low priority bins.

In an aspect of the disclosure, a method, a computer-readable medium, and an apparatus are provided. The apparatus may be configured to receive information indicative of a fovea region. The apparatus may be configured to divide a frame into a plurality of bins. The apparatus may be configured to determine, based on the information indicative of the fovea region, a bin layout to classify each respective bin of the plurality of bins as either a high priority bin or a low priority bin. The apparatus may be configured to render graphical content for the frame using the bin layout for the plurality of bins.

In an aspect of the disclosure, a method, a computer-readable medium, and an apparatus are provided. The apparatus may be configured to receive information indicative of a fovea region. The apparatus may be configured to render a frame using bin-based rendering. The apparatus may be configured to identify, based on the information indicative of the fovea region, high priority bins and low priority bins. The apparatus may be configured to determine a rendering time allotment for the frame. The apparatus may be configured to determine that the rendering time allotment for the frame will be exceeded, based on an amount of time used to render the high priority bins and the low priority bins. The apparatus may be configured to render, based on the determination that the rendering time allotment for the frame will be exceeded, at least one of the low priority bins at a first quality instead of a second quality.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
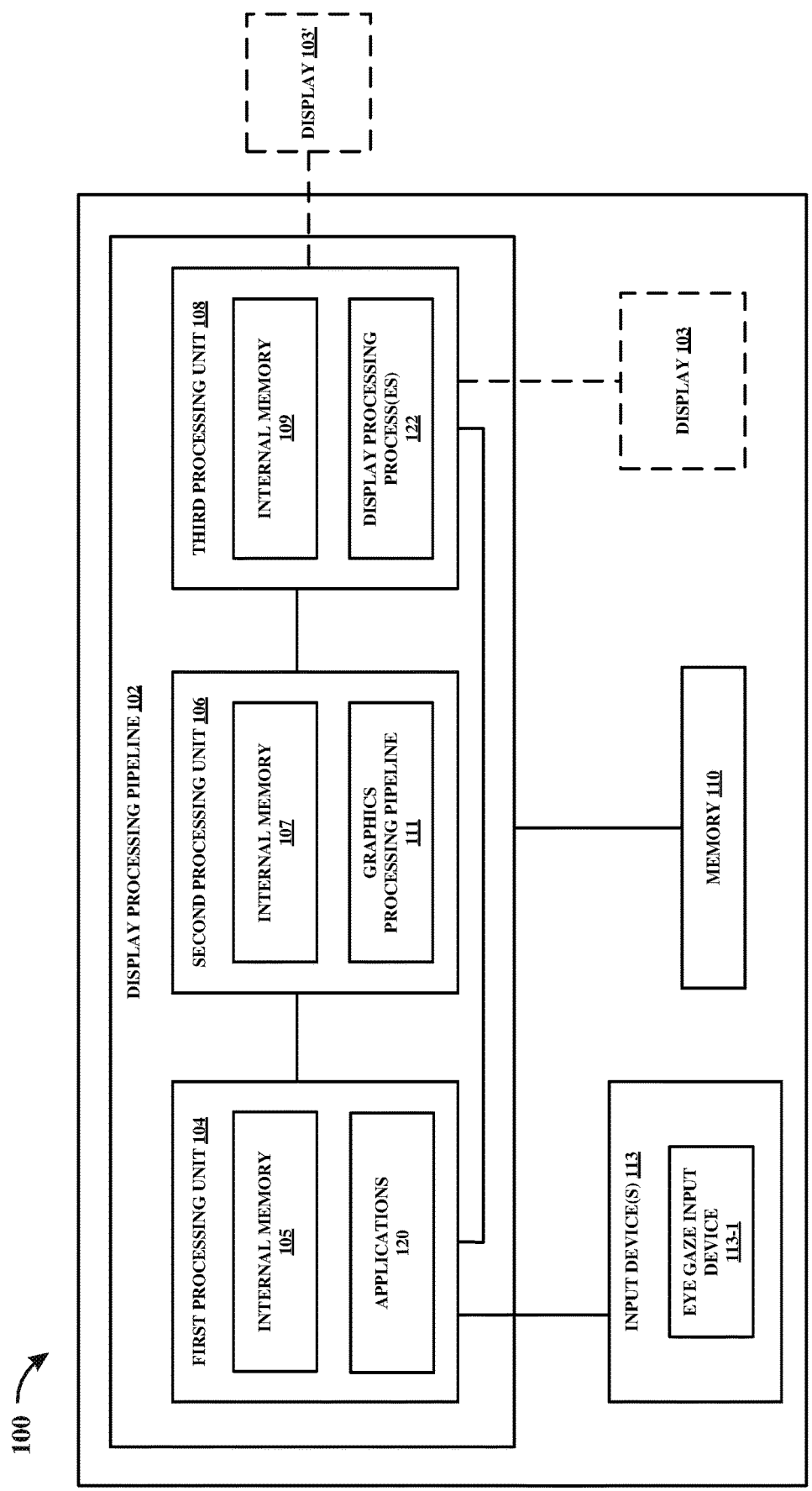
FIG. 1A is a block diagram that illustrates an example content generation and coding system in accordance with the techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems on a chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (i.e., software) being configured to perform one or more functions. In such examples, it is understood that the application may be stored on a memory (e.g., on-chip memory of a processor, system memory, or any other memory). Hardware described herein, such as a processor, may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (i.e., the frame includes two or more layers, and the frame that includes two or more layers may subsequently be blended).

As referenced herein, a first component (e.g., a GPU) may provide content, such as a frame, to a second component (e.g., a display processing unit). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

Low-latency rendering is used for comfortable virtual reality (VR) and augmented reality (AR) experiences. A VR system that renders at a low or inconsistent frame rate may cause users to become physically ill. An AR system unable to render with sufficiently low latency may be unable to convincingly anchor rendered content. VR and AR systems are often resource constrained and content may be rendered in accordance with a rendering deadline. The rendering deadline may be associated with a display refresh rate of a display for which the content is being rendered. After being rendered, the rendered content (e.g., a rendered frame) may be further processed (e.g., by a display processing unit) prior to being provided to a display for presentment thereon. Missing the rendering deadline introduces undesirable latency because the content being rendered is not ready for the next display refresh, which may cause the frame rate to be reduced. Thus, displayed content may stutter as a result of the reduced frame rate.

In accordance with the techniques described herein, a processing unit may be configured to adaptively render content to reduce or prevent the occurrence of missing a rendering deadline. A processing unit of AR/VR system may be configured to utilize foveated rendering using foveated information, where regions of the frame are rendered in varying levels of detail based on content, device properties, and area of user focus. In accordance with the techniques described herein, the foveation information may be utilized to prioritize regions across the frame such that a loss of quality in a low priority region could be implemented in order to finalize frame rendering in time for the next display refresh. The processing unit may be configured to perform binning as part of a binning operation mode. In the binning operation mode, the processing unit may be configured to prioritize the rendering based on foveation information, determine the rendering time allotted for each bin, and dynamically adjust workload to expedite rendering. The foveation information may indicate which regions of the frame are high priority and which are low priority. The high priority bins (e.g., bins near a fovea region) can be rendered at high quality (e.g., high resolution) and rendered before any of the low priority bins (e.g., bins further away from the fovea region). The low priority bins are bins that may be rendered at a lower quality (e.g., resolution) than that of the high priority bins, or not rendered at all. For example, the quality of the low priority bins may be sacrificed, such that the low priority bins are rendered at a lower than expected quality, if the rendering deadline for the frame is not going to be met. The reduction of quality of the low priority bins assists in reducing and/or preventing latency caused by untimely rendering of content by the processing unit, while minimizing the impact on the user because the regions in the foveal vision of the user are not impacted, while the regions in the peripheral vision may be reduced or dropped.

FIG. 1A is a block diagram that illustrates an example device 100 configured to perform one or more techniques of this disclosure. The device 100 includes display processing pipeline 102 configured to perform one or more techniques of this disclosure. In accordance with the techniques described herein, the display processing pipeline 102 may be configured to generate content destined for display. The display processing pipeline 102 may be communicatively coupled to a display 103. In the example of FIG. 1A, the display 103 is a display of the device 100. However, in other examples, the display 103 may be a display external to the device 100 (as shown in FIG. 1 with display 103'). Reference to display 103 may refer to display 103 or display 103' (i.e., a display of the device or a display external to the device).

In examples where the display 103 is not external to the device 100, a component of the device may be configured to transmit or otherwise provide commands and/or content to the display 103 for presentment thereon. In examples where the display 103 is external to the device 100, the device 100 may be configured to transmit or otherwise provide commands and/or content to the display 103 for presentment thereon. As used herein, "commands," "instructions," and "code" may be used interchangeably. In some examples, the display 103 of the device 100 may represent a display projector configured to project content, such as onto a viewing medium (e.g., a screen, a wall, or any other viewing medium). In some examples, the display 103 may include one or more of: a liquid crystal display (LCD), a plasma display, an organic light emitting diode (OLED) display, a projection display device, an augmented reality (AR) display device, a virtual reality (VR) display device, a head-mounted display, a wearable display, a touchscreen display, or any other type of display.

In some examples, the display 103 represents a first display and a second display, where the first display is for presenting display content for a left eye of a user and the second display is for presenting display content for a right eye of a user. In such examples, the first display and the second display may be respectively referred to as a left eye display and a right eye display. In some examples, the display 103 may be a video mode display. In other examples, the display 103 may be a command mode display.

The display processing pipeline 102 may include one or more components (or circuits) configured to perform one or more techniques of this disclosure. As used herein, reference to the display processing pipeline being configured to perform any function, technique, or the like refers to one or more components of the display processing pipeline being configured to form such function, technique, or the like.

In the example of FIG. 1A, the display processing pipeline 102 includes a first processing unit 104, a second processing unit 106, and a third processing unit 108. In some examples, the first processing unit 104 may be configured to execute one or more applications 120, the second processing unit 106 may be configured to perform graphics processing, and the third processing unit 108 may be configured to perform display processing. In such examples, the first processing unit 104 may be a central processing unit (CPU), the second processing unit 106 may be a graphics processing unit (GPU) or a general purpose GPU (GPGPU), and the third processing unit 108 may be a display processing unit, which may also be referred to as a display processor. In other examples, the first processing unit 104, the second processing unit 106, and the third processing unit 108 may each be any processing unit configured to perform one or more features described with respect to each processing unit.

The first processing unit may include an internal memory 105. The second processing unit 106 may include an internal memory 107. In some examples, the internal memory 107 may be referred to as a GMEM. The third processing unit 108 may include an internal memory 109. One or more of the processing units 104, 106, and 108 of the display processing pipeline 102 may be communicatively coupled to a memory 110. The memory 110 may be external to the one or more of the processing units 104, 106, and 108 of the display processing pipeline 102. For example, the memory 110 may be a system memory. The system memory may be a system memory of the device 100 that is accessible by one or more components of the device 100. For example, the first processing unit 104 may be configured to read from and/or write to the memory 110. The second processing unit 106 may be configured to read from and/or write to the memory 110. The third processing unit 108 may be configured to read from and/or write to the memory 110. The first processing unit 104, the second processing unit 106, and the third processing unit 108 may be communicatively coupled to the memory 110 over a bus. In some examples, the one or more components of the display processing pipeline 102 may be communicatively coupled to each other over the bus or a different connection. In other examples, the system memory may be a memory external to the device 100.

The internal memory 105, the internal memory 107, the internal memory 109, and/or the memory 110 may include one or more volatile or non-volatile memories or storage devices. In some examples, the internal memory 105, the internal memory 107, the internal memory 109, and/or the memory 110 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 105, the internal memory 107, the internal memory 109, and/or the memory 110 may be a non-transitory storage medium according to some examples. The term "non-transitory" may indicate that the storage medium is not embodied in a carrier wave or a propagated signal. However, the term "non-transitory" should not be interpreted to mean that the internal memory 105, the internal memory 107, the internal memory 109, and/or the memory 110 is non-movable or that its contents are static. As one example, the memory 110 may be removed from the device 100 and moved to another device. As another example, the memory 110 may not be removable from the device 100.

In some examples, the first processing unit 104 may be configured to perform any technique described herein with respect to the second processing unit 106. In such examples, the display processing pipeline 102 may only include the first processing unit 104 and the third processing unit 108. Alternatively, the display processing pipeline 102 may still include the second processing unit 106, but one or more of the techniques described herein with respect to the second processing unit 106 may instead be performed by the first processing unit 104.

In some examples, the first processing unit 104 may be configured to perform any technique described herein with respect to the third processing unit 108. In such examples, the display processing pipeline 102 may only include the first processing unit 104 and the second processing unit 106. Alternatively, the display processing pipeline 102 may still include the third processing unit 108, but one or more of the techniques described herein with respect to the third processing unit 108 may instead be performed by the first processing unit 104.

In some examples, the second processing unit 106 may be configured to perform any technique described herein with respect to the third processing unit 108. In such examples, the display processing pipeline 102 may only include the first processing unit 104 and the second processing unit 106. Alternatively, the display processing pipeline 102 may still include the third processing unit 108, but one or more of the techniques described herein with respect to the third processing unit 108 may instead be performed by the second processing unit 106.

The first processing unit 104 may be configured to execute one or more applications 120. The first processing unit 104 may be configured to provide one or more commands/instructions (e.g., draw instructions) to the second processing unit 106 to cause the second processing unit 106 to generate graphical content. As used herein, "commands," "instructions," and "code" may be used interchangeably. For example, execution of an application of the one or more applications 120 may cause one or more commands/instructions (e.g., draw instructions) corresponding to the application to be provided to the second processing unit 106 to generate graphical content for the application. In some examples, an application may be software (e.g., code) stored in the internal memory 105. In other examples, an application may be software stored in the memory 110 or another memory accessible to the first processing unit 104. In other examples, an application may be software stored in multiple memories, such as the internal memory 105 and the memory 110.

The second processing unit 106 may be configured to perform graphics processing in accordance with the techniques described herein, such as in a graphics processing pipeline 111. Otherwise described, the second processing unit 106 may be configured to perform any process described herein with respect to the second processing unit 106. For example, the second processing unit 106 may be configured to generate graphical content using tile-based rendering (also referring to as "binning"), direct rendering, adaptive rendering, foveated rendering, spatial anti-alias rendering, and/or any graphics processing technique.

In tile-based rendering, the second processing unit 106 may be configured to divide a buffer (e.g., a framebuffer, frame) into sub-regions referred to as bins or tile. For example, if the internal memory 107 is able to store N memory units of data (where N is a positive integer), then a scene may be divided into bins such that the pixel data contained in each bin is less than or equal to N memory units. In this way, the second processing unit 106 may render the scene by dividing the scene into bins that can be individually rendered into the internal memory 107, store each rendered bin from internal memory 107 to a framebuffer or frame (which may be located in the memory 110), and repeat the rendering and storing for each bin of the scene. It is understood that a rendered frame is the combination of the rendered bins. Rendering a bin into the internal memory 107 may include executing commands to render the primitives in the associated bin into the internal memory 107. The buffer that stores the rendered frame (i.e., the rendered bins corresponding to the frame) may be referred to as a framebuffer. The framebuffer is allocated memory that holds one or more rendered frames that can be read by one or more other components, such as the third processing unit 108. Therefore, reference to dividing a framebuffer into sub-regions refers to configuring the second processing unit 106 to render graphical content corresponding to a frame on a bin-by-bin basis.

As described herein, the bins defined during the binning pass may be synonyms for bins/tiles of a rendered frame (which may be referred to as the rendered scene). For example, each bin may represent a portion of the rendered frame. The bins making up a scene can each be associated with a bin in memory that stores the graphical content included in each respective bin. A bin may be a portion of a memory that stores a portion of a rendered frame.

Tile-based rendering generally includes two passes: a binning pass and a rendering pass. During the binning pass, the second processing unit 106 may be configured to receive and process draw commands for a particular scene in preparation for rendering the scene into a frame. A draw command may include one or more primitives. A primitive may have one or more vertices. The second processing unit 106 may be configured to generate position data (e.g., coordinate data, such as three-axis (X, Y, Z) coordinate data) in screen space for each vertex of each primitive in the draw commands for a particular scene. During the binning pass, the second processing unit 106 may be configured to divide a buffer into which a frame is to be rendered into bins. In some examples, the second processing unit 106 may be configured to generate visibility information for each bin during the binning pass. In this regard, it is understood that the second processing unit 106 may be configured to generate visibility information on a per bin basis (e.g., visibility information is generated for each bin).

After generating visibility information for each bin (e.g., during the binning pass), the second processing unit 106 may be configured to separately render each respective bin using the respective visibility information for each respective bin. In some examples, the second processing unit 106 may be configured to use the visibility stream generated during the binning pass to refrain from rendering primitives identified as invisible during the binning pass, which avoids overdraw. Accordingly, only the visible primitives and/or the possibly visible primitives are rendered into each bin.

During the rendering of each bin, the second processing unit 106 may be configured to store the pixel values corresponding to the bin being rendered in the internal memory 107. In this way, tile-based rendering uses the internal memory 107 of the second processing unit 106. The second processing unit 106 may be configured to store (e.g., copy) a rendered bin stored in the internal memory 107 to a memory external to the second processing unit 106, such as memory 110. In some examples, once a bin is fully rendered into the internal memory 107, the second processing unit 106 may be configured to store the fully rendered bin to a memory external to the second processing unit 106. In other examples, the second processing unit 106 may be configured to render graphical content for a bin into the internal memory 107 and store graphical content rendered into the internal memory 107 into a memory external to the second processing unit 106 in parallel.

As used herein, "visibility information" may, in some examples, refer to any information in any data structure that indicates whether one or more primitives is visible and/or may be visible (e.g., possibly visible) with respect to the bin for which the visibility information was generated. Whether a primitive is visible/possibly visible or not visible may, as described herein, respectively refer to whether the primitive will be rendered or not rendered with respect to the bin for which the visibility information was generated. As used herein, a primitive that "may be visible" (e.g., a possibly visible primitive) may refer to the fact that it is unknown whether the primitive will be visible or will not be visible in the rendered frame (i.e., in the respective rendered bin of the rendered frame) at a particular processing point in the graphics processing pipeline (e.g., during the binning pass before the rendering pass) according to one example. In another example, a primitive that "may be visible" (e.g., a possibly visible primitive) may refer to a primitive that is not or will not be definitively visible in the rendered frame (i.e., in the respective rendered bin of the rendered frame) at a particular processing point in the graphics processing pipeline (e.g., during the binning pass before the rendering pass).

For example, "visibility information" may refer to any information in any data structure that indicates whether one or more primitives associated with one or more draw commands is visible and/or may be visible with respect to the bin. As another example, "visibility information" may be described as a visibility stream that includes a sequence of 1's and 0's with each "1" or "0" being associated with a particular primitive located within the bin. In some examples, each "1" may indicate that the primitive respectively associated therewith is or may be visible in the rendered frame (i.e., in the respective rendered bin of the rendered frame), and each "0" may indicate that the primitive respectively associated therewith will not be visible in the rendered frame (i.e., in the respective rendered bin of the rendered frame). In other examples, each "0" may indicate that the primitive respectively associated therewith is or may be visible in the rendered frame (i.e., in the respective rendered bin of the rendered frame), and each "1" may indicate that the primitive respectively associated therewith will not be visible in the rendered frame (i.e., in the respective rendered bin of the rendered frame). In other examples, "visibility information" may refer to a data structure that includes visibility information in a format different from a visibility stream.

In direct rendering, the second processing unit 106 may be configured to render directly to the framebuffer (e.g., a memory location in memory 110) in one pass. Otherwise described, the second processing unit 106 may be configured to render graphical content to the framebuffer without using the internal memory 107 for intermediate storage of rendered graphical content. In some examples, direct rendering mode may be considered as a single bin in accordance with how tile-based rendering is performed, except that the entire framebuffer is treated as a single bin. As referred to herein, a rendering mode (e.g., a direct rendering mode, a tile-based rendering mode, an adaptive rendering mode, a foveated rendering mode, and a spatial anti-alias rendering mode) may refer to the second processing unit 106 being configured to perform one or more techniques associated with the rendering mode.

In adaptive rendering, the second processing unit 106 may be configured to combine one or more techniques of tile-based rendering and one or more techniques of direct rendering. For example, in adaptive rendering, one or more bins may be rendered to the internal memory 107 and subsequently stored from the internal memory 107 to the framebuffer in a memory external to the second processing unit 106 (e.g., the bins that are rendered using tile-based rendering mode), and one or more bins may be rendered directly to the framebuffer in the memory external to the second processing unit 106 (e.g., the bins that are rendered using direct rendering mode). The second processing unit 106 may be configured to render bins that are to be rendered using direct rendering using the visibility information generated during the binning pass for these respective bins and the rendering of these direct rendered bins may occur in one rendering pass. Conversely, the second processing unit 106 may be configured to render bins that are to be rendered using tile-based rendering using the visibility information generated during the binning pass for these respective bins and the rendering of these tile-based rendered bins may occur in multiple rendering passes (e.g., a respective rendering pass for each respective bin of the bins that are rendered using tile-based rendering).

In foveated rendering, the second processing unit 106 may be configured to render graphical content of a frame based on information indicative of an eye gaze region (e.g., fovea region). The human vision system results in high resolution vision in the fovea (the central vision area, which is where a person is looking) and low resolution in the peripheral region around the fovea. Foveated rendering leverages how the human vision system works by rendering graphical content corresponding to an eye gaze region (e.g., fovea region) at a high resolution, and rendering graphical content corresponding the peripheral region around the eye gaze region at a low resolution. By reducing the resolution in the peripheral region, the computational load of the second processing unit 106 may be reduced, thus resulting in more efficient processing.

In some examples, rendering graphical content to a framebuffer may refer to writing pixel values to the framebuffer. A pixel value may have one or more components, such as one or more color components. Each component may have a corresponding value. For example, a pixel in the red, green, and blue color space may have a red color component value, a greed color component value, and a blue color component value.

Figure 1B:
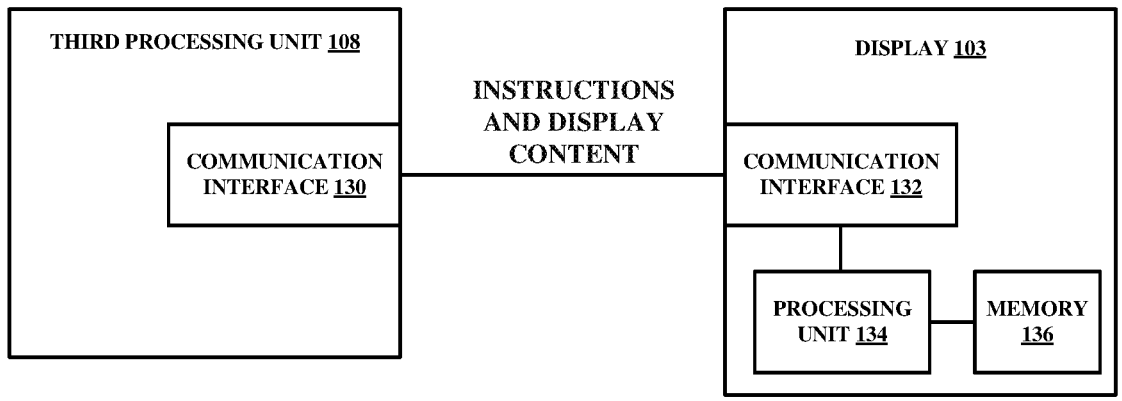
FIG. 1B is a block diagram that illustrates an example configuration between a component of the device depicted in FIG. 1A and a display in accordance with the techniques of this disclosure.

FIG. 1B is a block diagram that illustrates an example configuration between the third processing unit 108 of the device and the display 103 in accordance with the techniques of this disclosure. The example of display 103 in FIG. 1B is an example of a smart panel or a command mode panel. The third processing unit 108 and the display 103 may be configured to communicate with each other over a communication medium (e.g., a wired and/or wireless communication medium). For example, the third processing unit 108 may include a communication interface 130 (e.g., a bus interface) and the display 103 may include a communication interface 132 (e.g., a bus interface) that enables communication between each other. In some examples, the communication between the third processing unit 108 and the display 103 may be compliant with a communication standard, communication protocol, or the like. For example, the communication between the third processing unit 108 and the display 103 may be compliant with the Display Serial Interface (DSI) standard. In some examples, the third processing unit 108 may be configured to provide data (e.g., display content) to the display 103 for presentment thereon. The third processing unit 108 may also be configured to provide commands/instructions to the display 103, such as when the display 103 is a command mode display. The display 103 may include a processing unit 134 and a memory 136 accessible by the processing unit 134. The processing unit 134 may be referred to as a display controller. The memory 136 may be configured to store data that the display 103 receives from the third processing unit 108. For example, the memory 136 may be configured to store (e.g., buffer) frames received from the third processing unit 108. The processing unit 134 may be configured to read data stored in the memory 136 that was received from the third processing unit 108 and drive the display 103 based on one or more commands received from the third processing unit 108.

Figure 1C:
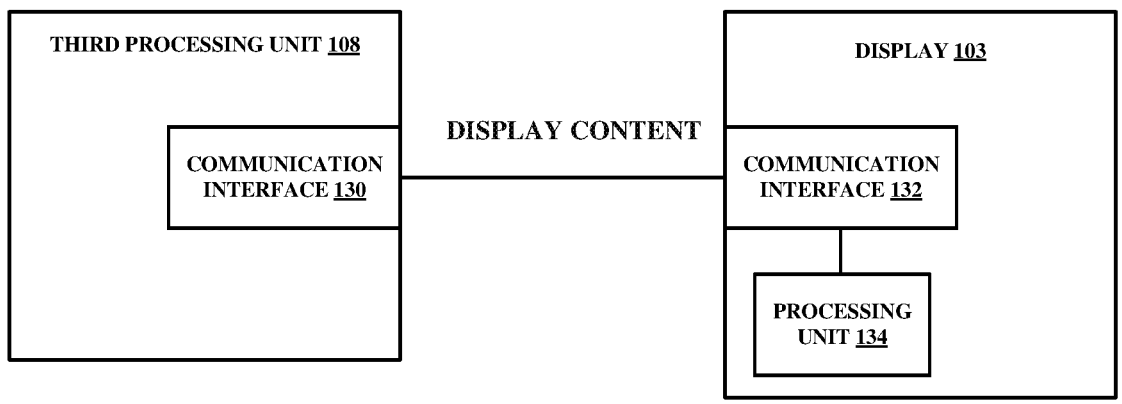
FIG. 1C is a block diagram that illustrates an example configuration between a component of the device depicted in FIG. 1A and a display in accordance with the techniques of this disclosure.

FIG. 1C is a block diagram that illustrates an example configuration between the third processing unit 108 of the device and the display 103 in accordance with the techniques of this disclosure. The example of display 103 in FIG. 1C is an example of a dumb panel or a video mode panel. The third processing unit 108 and the display 103 may be configured to communicate with each other over a communication medium (e.g., a wired and/or wireless communication medium). For example, the third processing unit 108 may include a communication interface 130 (e.g., a bus interface) and the display 103 may include a communication interface 132 (e.g., a bus interface) that enables communication between each other. In some examples, the communication between the third processing unit 108 and the display 103 may be compliant with a communication standard, communication protocol, or the like. For example, the communication between the third processing unit 108 and the display 103 may be compliant with the Display Serial Interface (DSI) standard. In some examples, the third processing unit 108 may be configured to provide data (e.g., display content) to the display 103 for presentment thereon. The display 103 may include a processing unit 134 and may not include a memory. The processing unit 134 may be referred to as a display driver. The processing unit 134 may be configured to cause the display content received from the third processing unit 108 to be displayed on the display 103.

In some examples, one or more components of the device 100 and/or display processing pipeline 102 may be combined into a single component. For example, one or more components of the display processing pipeline 102 may be one or more components of a system on chip (SoC), in which case the display processing pipeline 102 may still include the first processing unit 104, the second processing unit 106, and the third processing unit 108; but as components of the SoC instead of physically separate components. In other examples, one or more components of the display processing pipeline 102 may be physically separate components that are not integrated into a single component. For example, the first processing unit 104, the second processing unit 106, and the third processing unit 108 may each be a physically separate component from each other. It is appreciated that a display processing pipeline may have different configurations. As such, the techniques described herein may improve any display processing pipeline and/or display, not just the specific examples described herein.

In some examples, one or more components of the display processing pipeline 102 may be integrated into a motherboard of the device 100. In some examples, one or more components of the display processing pipeline 102 may be present on a graphics card of the device 100, such as a graphics card that is installed in a port in a motherboard of the device 100 or a graphics card incorporated within a peripheral device configured to interoperate with the device 100.

The first processing unit 104, the second processing unit 106, and/or the third processing unit 108 may include one or more processors, such as one or more microprocessors, ASICs, FPGAs, arithmetic logic units (ALUs), DSPs, discrete logic, software, hardware, firmware, other equivalent integrated or discrete logic circuitry, or any combinations thereof. In examples where the techniques described herein are implemented partially in software, the software (instructions, code, or the like) may be stored in a suitable, non-transitory computer-readable storage medium accessible by the processing unit. The processing unit may execute the software in hardware using one or more processors to perform the techniques of this disclosure. For example, one or more components of the display processing pipeline 102 may be configured to execute software. The software executable by the first processing unit 104 may be stored in the internal memory 105 and/or the memory 110. The software executable by the second processing unit 106 may be stored in the internal memory 107 and/or the memory 110. The software executable by the third processing unit 108 may be stored in the internal memory 109 and/or the memory 110.

As described herein, a device, such as the device 100, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality (AR) device, or a virtual reality (VR) device), a non-wearable device (e.g., a non-wearable AR device or a non-wearable VR device), a wireless communication device, any AR device, any VR device, a display (e.g., display device), a television, a television set-top box, an intermediate network device, a digital media player, a video streaming device, a content streaming device, an in-car computer, any mobile device, any device configured to generate content, or any device configured to perform one or more techniques described herein. In some examples, the device 100 may be an apparatus. The apparatus may be a processing unit, an SOC, or any device.

As described herein, devices, components, or the like may be described herein as being configured to communicate with each other. For example, one or more components of the display processing pipeline 102 may be configured to communicate with one or more other components of the device 100, such as the display 103, the memory 110, and/or one or more other components of the device 100 (e.g., one or more input devices). One or more components of the display processing pipeline 102 may be configured to communicate with each other. For example, the first processing unit 104 may be communicatively coupled to the second processing unit 106 and/or the third processing unit 108. As another example, the second processing unit 106 may be communicatively coupled to the first processing unit 104 and/or the third processing unit 108. As another example, the third processing unit 108 may be communicatively coupled to the first processing unit 104 and/or the second processing unit 106.

As described herein, communication may include the communicating of information from a first component to a second component (or from a first device to a second device). The information may, in some examples, be carried in one or more messages. As an example, a first component in communication with a second component may be described as being communicatively coupled to or otherwise with the second component. For example, the first processing unit 104 and the second processing unit 106 may be communicatively coupled. In such an example, the first processing unit 104 may communicate information to the second processing unit 106 and/or receive information from the second processing unit 106.

In some examples, the term "communicatively coupled" may refer to a communication connection, which may be direct or indirect. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. In some examples, a communication connection may enable the communication of information (e.g., the output of information, the transmission of information, the reception of information, or the like). In some examples, the term "communicatively coupled" may refer to a temporary, intermittent, or permanent communication connection.

Any device or component described herein may be configured to operate in accordance with one or more communication protocols. For example, a first and second component may be communicatively coupled over a connection. The connection may be compliant or otherwise be in accordance with a communication protocol. As used herein, the term "communication protocol" may refer to any communication protocol, such as a communication protocol compliant with a communication standard or the like. As an example, a communication protocol may include the Display Serial Interface (DSI) protocol. DSI may enable communication between the third processing unit 108 and the display 103 over a connection, such as a bus.

In accordance with the techniques described herein, the second processing unit 106 may be configured to more efficiently generate graphical content. For example, the second processing unit 106 may be configured to more efficiently generate graphical content using foveated rendering, tile-based rendering and/or adaptive rendering. For example, the second processing unit 106 may be configured to receive information indicative of a fovea region. Based on the information indicative of the fovea region, the second processing unit 106 may be configured to identify which bin(s) corresponding to a frame are high priority bins and identify which bin(s) corresponding to the frame are low priority bins, such that the bins are rendered in order of priority level indicated by foveation parameters. In such examples, the second processing unit 106 may be configured to more efficiently generate graphical content, such as by dynamically adjusting workload during the frame rendering and maximizing the use of available rendering capabilities in accordance with the techniques described herein. In some examples, foveation parameters may include: resolution, anti-aliasing level, blurring level, filtering applied, texture level of detail, and geometric level of detail.

For example, in accordance with the techniques described herein, the second processing unit 106 may be configured to render one or more high priority bins before rendering one or more low priority bins. In such an example, the one or more high priority bins may be rendered at a high quality resolution, as determined by the foveation parameters and may be subsequently stored in the framebuffer. In such an example, the one or more low priority bins may be rendered at a low quality resolution, as determined by the foveation parameters. The low quality resolution is a resolution that is less that the high quality resolution of the high priority bins.

In such an example, the second processing unit 106 may be described as being configured to render a first graphical content for the one or more high priority bins using tile-based rendering, and render a second graphical content for the one or more low priority bins using a tile-based rendering that is dynamically adjustable. The first graphical content and the second graphical content may be part of the same frame. The one or more high priority bins may correspond to or otherwise by associated with an eye gaze region (e.g. fovea region), and the one or more low priority bins may correspond to or otherwise be associated with a peripheral region outside of the eye gaze region.

The second processing unit 106 may be configured to render first graphical content for the one or more high priority bins on a bin per bin basis into a buffer (e.g., a framebuffer in the internal memory 107), and also render second graphical content for the one or more low priority bins on a bin per bin basis into the buffer. The first and second graphical content may both correspond to the same frame. Otherwise described, the frame being rendered includes the first and second graphical content. The first graphical content corresponds to graphical content associated with the one or more high priority bins. The second graphical content corresponds to graphical content associated with the one or more low priority bins. In accordance with the techniques described herein, the second processing unit 106 may be configured to dynamically adjust the rendering quality of zero or more of the one or more low priority bins during the rendering of the frame with which the one or more low priority bins are associated. In some examples, this may be referred to as dynamically adjustable tile-based rendering. For example, the first graphical content may be rendered at a quality that is higher than the quality of the second graphical content. The second processing unit 106 may be configured to render the second graphical content at one or more different quality levels, where each of the quality levels for the second graphical content is less than the quality of the first graphical content. The second processing unit 106 may be configured to dynamically adjust the workload of rendering the frame during rendering by reducing the quality at which one or more low priority bins is rendered. The workload may be dynamically adjusted if the second processing unit 106 determines that a frame refresh deadline is on schedule to be missed or is on schedule to be met. In examples where the frame refresh deadline is going to be missed, the second processing unit 106 can degrade the rendering quality of at least one of the one or more low priority bins to complete the frame rendering process in time for the frame refresh deadline.

By rendering the frame based on the priority levels indicated by the foveation parameters, the second processing unit 106 ensures that the first graphical content rendered for the one or more high quality bins is rendered to meet the frame refresh deadline, and can identify which regions of the frame (e.g., the one or more low priority bins) can be rendered at a lower quality in order to meet the frame refresh deadline. The second processing unit 106 may be configured to identify which regions of the frame can sacrifice render quality if the second processing unit 106 determines that the frame will not be rendered in time for the frame refresh deadline. As such, the second processing unit 106, by being configured to dynamically adjust the workload during the frame rendering, is configured to more efficiently generate graphical content and maximize available rendering capabilities.

Figure 6A:
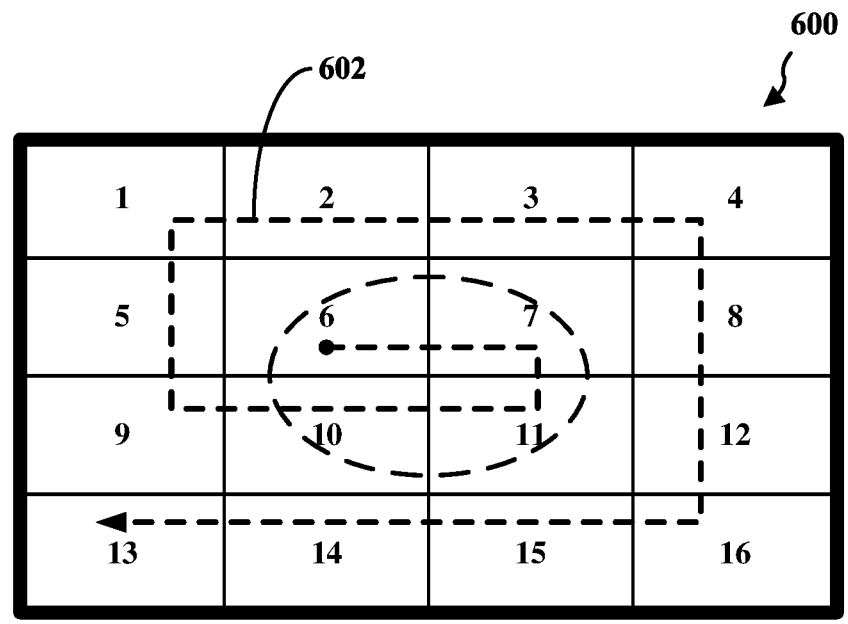
FIGS. 6A-E illustrate example frames with fovea regions overlapping multiple bins in accordance with the techniques of this disclosure.
Figure 6A:
Figure 6A:
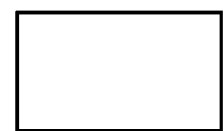
Figure 6A:
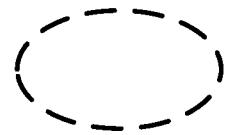

FIGS. 6A-E illustrate example frames with an eye gaze region overlapping multiple bins in accordance with the techniques of this disclosure. In the example of FIG. 6A, a framebuffer 600 is divided into 16 bins and bins 6, 7, 10, and 11 overlap with the eye gaze region. Based on information indicative of the eye gaze region, the second processing unit 106 may be configured to determine which bin(s) of bins 1-16 are to be identified as high priority bins and determine which bin(s) of bins 1-16 are to be identified as low priority bins. Otherwise described, the second processing unit 106 may be configured to determine which bin(s) of bins 1-16 are to be rendered at a high resolution and determine which bin(s) of bins 1-16 are to be rendered at a low resolution and/or at a degraded resolution. In the example of FIG. 6A, the second processing unit 106 may be configured to determine that bins 6, 7, 10, and 11 are to be identified as high priority bins rendered using a tile-based rendering mode, and determine that bins 1-5, 8, 9, and 12-16 are to be identified as low priority bins and rendered after bins 6, 7, 10, and 11 have been rendered. In such an example, bins 1-5, 8, 9, and 12-16 may be rendered using the dynamically adjustable tile-based rendering mode. Otherwise described, the second processing unit 106 may be configured to determine a prioritized rendering order, such that the group of bins 6, 7, 10, and 11 are to be rendered first and at a high resolution/quality, and determine that the group of bins 1-5, 8, 9, and 12-16 are to be rendered after all of the group of bins 6, 7, 10, and 11 have been rendered, and are to be rendered at a quality that is less than the quality of the group of bins 6, 7, 10, and 11. In some examples, the second processing unit 106 may be configured to render bins 6, 7, 10, and 11 using any order, so long as all of the bins 6, 7, 10, and 11 are rendered prior to any of the bins 1-5, 8, 9, and 12-16 are rendered. The second processing unit 106 may be configured to render bins 1-5, 8, 9, and 12-16 using any order, so long as they are rendered after all of the bins 6, 7, 10, and 11 have been rendered. In such examples, the second processing unit 106 is configured to more efficiently generate graphical content for the frame by prioritizing the rendering based on foveation parameters, such that bins within the fovea region are rendered prior to bins that are not within the fovea region (e.g., a peripheral region). The second processing unit 106 may also be configured to minimize and/or maintain low latency such as by dynamically reducing the quality of the bins (e.g., low priority bins) that are not within the fovea region during the rendering of the bins that are not within the fovea region in accordance with the techniques described herein.

In the example of FIG. 6A, the second processing unit 106 is configured to determine which bins are to be identified as high priority bins and low priority bins based on information indicative of the eye gaze region or fovea region. However, the priority of the bins can be determined based on many different factors, such that the disclosure is not intended to be limited to the priority of the bins being based on the eye gaze region. In some examples, the priority of the bins can be determined based on priority regions identified by the application, priority regions identified by the operating system (OS), priority regions identified by the VR/AR framework, and/or priority regions based on location on the device's display.

In the example of FIG. 6A, the second processing unit 106 may be configured to generate visibility information for each bin of bins 1-16, such as during a binning pass. The second processing unit 106 may be configured to render each bin of bins 6, 7, 10, and 11 on a per bin basis based on the respective visibility information for each respective bin. For example, the second processing unit 106 may be configured to render bin 6 using visibility information generated for bin 6 in a first rendering pass, render bin 7 using visibility information generated for bin 7 in a second rendering pass, render bin 10 using visibility information generated for bin 10 in a third rendering pass, and render bin 11 using visibility information generated for bin 11 in a fourth rendering pass. The number of the rendering passes in this example does not imply the order in which these separate renderings occur. Rather, the numbering of the rendering passes connotes that each rendering pass is separate and distinct from the other rendering passes.

The second processing unit 106 may be configured to render each of bins 6, 7, 10, and 11 into the internal memory 107. As described herein, reference to rendering a bin refers to rendering graphical content corresponding to the bin, and vice versa. In examples described herein where a bin is rendered into the internal memory 107 (e.g., bins 6, 7, 10, and 11), the internal memory 107 may be referred to as an intermediate buffer, an intermediate framebuffer, a bin buffer, or the like because the rendered bin will be subsequently stored in the framebuffer in memory 110.

In some examples, the second processing unit 106 may be configured to render each bin of bins 1-5, 8, 9, and 12-16 on a per bin basis based on the respective visibility information for each respective bin. For example, the second processing unit 106 may be configured to render bin 1 using visibility information generated for bin 1 in a first rendering pass, render bin 2 using visibility information generated for bin 2 in a second rendering pass, render bin 3 using visibility information generated for bin 3 in a third rendering pass, render bin 4 using visibility information generated for bin 4 in a fourth rendering pass, render bin 5 using visibility information generated for bin 5 in a fifth rendering pass, render bin 8 using visibility information generated for bin 8 in a sixth rendering pass, render bin 9 using visibility information generated for bin 9 in a seventh rendering pass, render bin 12 using visibility information generated for bin 12 in a eighth rendering pass, render bin 13 using visibility information generated for bin 13 in a ninth rendering pass, render bin 14 using visibility information generated for bin 14 in a tenth rendering pass, render bin 15 using visibility information generated for bin 15 in a eleventh rendering pass, and render bin 16 using visibility information generated for bin 16 in a twelfth rendering pass. The number of the rendering passes in this example does not imply the order in which these separate rendering occur. Rather, the numbering of the rendering passes connotes that each rendering pass is separate and distinct from the other rendering passes.

FIG. 6A provides an example of a render order 602, where the second processing unit 106 has identified bins 6, 7, 10, and 11 as high priority bins, and identified bins 1-5, 8, 9, and 12-16 as low priority bins. Bins 6, 7, 10, and 11 have been identified, by the second processing unit 106, as high priority bins because they overlap the fovea region. Bins 1-5, 8, 9, and 12-16 have been identified, by the second processing unit 106, as low priority bins because they do not overlap the fovea region. In this example, the second processing unit renders the high priority bins in the following order: 6, 7, 11, and 10. Afterwards, the render order 602 can continue to the low priority bins, such that the second processing unit 106 can render the low priority bins in the following order: 9, 5, 1-4, 8, 12, 16, 15, 14, and 13. The render order 602 of FIG. 6A is merely an example, such that many more render orders are possible. The disclosure is not intended to be limited to the example of FIG. 6A.

Figure 6B:
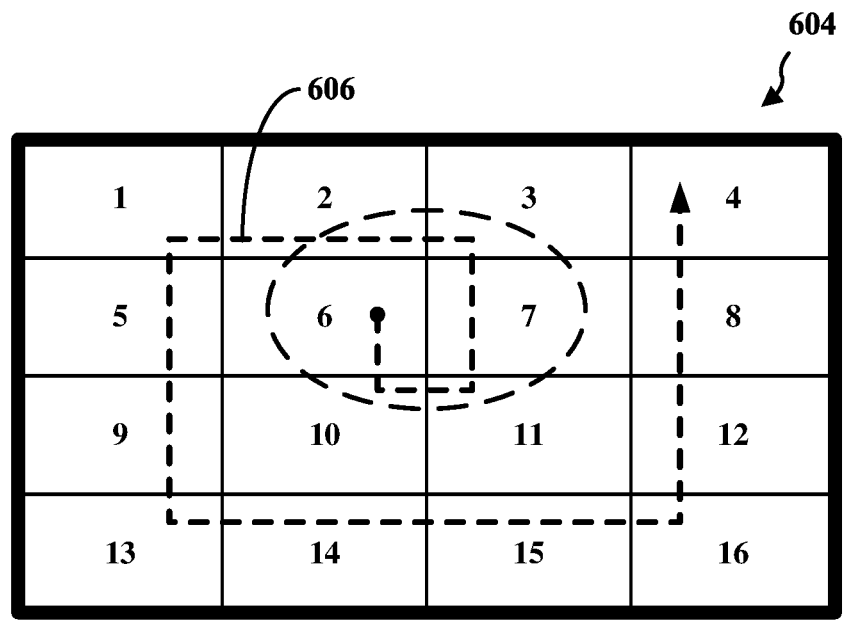
Figure 6B:
Figure 6B:
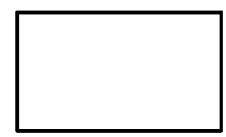
Figure 6B:
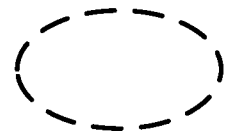

FIG. 6B provides another example of a render order 606. In this example, the second processing unit 106 has identified bins 2, 3, 6, 7, 10 and 11 as high priority bins because they overlap the fovea region, while bins 1, 4, 5, 8, 9, and 12-16 are low priority bins because they do not overlap the fovea region. In the example of FIG. 6B, the fovea region is shifted upwards with respect to the fovea region of FIG. 6A. FIG. 6B provides an example of a frame where the fovea region is not located at the central region of the frame. In this example, the second processing unit 106 may render the high priority bins in the following order: 6, 10, 11, 7, 3, and 2. Afterwards, the render order 606 continues to the low priority bins, such that the second processing unit 106 can render the low priority bins in the following order: 1, 5, 9, 13-16, 12, 8, and 4. The render order 606 of FIG. 6B is merely an example, such that many more render orders are possible.

Figure 6C:
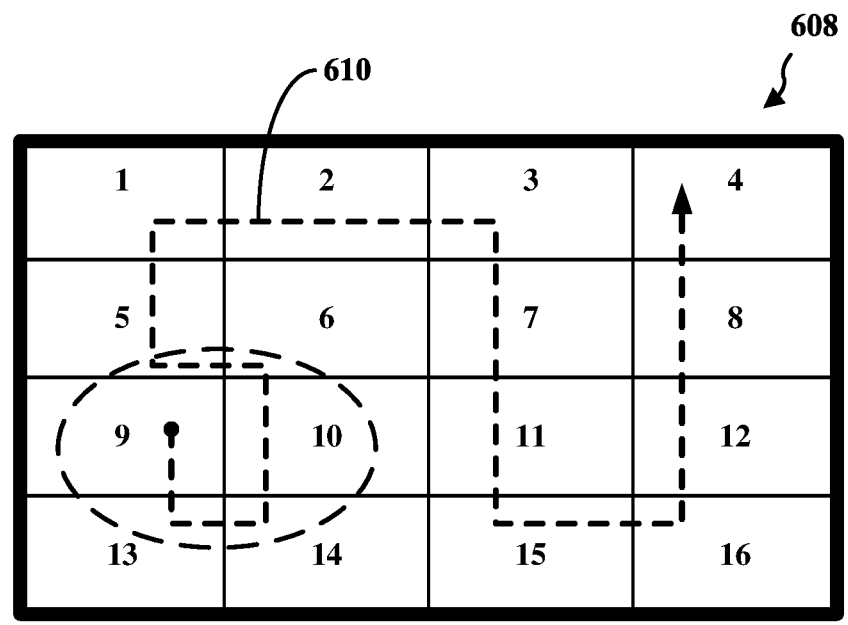
Figure 6C:
Figure 6C:
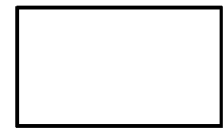
Figure 6C:
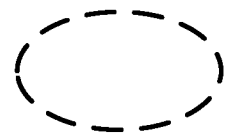

FIG. 6C provides yet another example of a render order 610. In this example, the second processing unit 106 has identified bins 5, 6, 9, 10, 13, and 14 as high priority bins because they overlap the fovea region, while bins 1-4, 7, 8, 11, 12, 15, and 16 are low priority bins because they do not overlap the fovea region. In the example of FIG. 6C, the fovea region is located in the bottom left corner. FIG. 6C provides another example of a frame where the fovea region is not located at the central region of the frame. In this example, the second processing unit 106 may render the high priority bins in the following order: 9, 13, 14, 10, 6, and 5. Afterwards, the render order 610 continues to the low priority bins, such that the second processing unit 106 can render the low priority bins in the following order: 1-3, 7, 11, 15, 16, 12, 8, and 4. The render order 610 of FIG. 6C is merely an example, such that many more render orders are possible. In some examples, the render order among the high priority bins or the low priority bins can be determined based on different factors, such as but not limited to, raster order or based on another predetermined order.

Figure 6D:
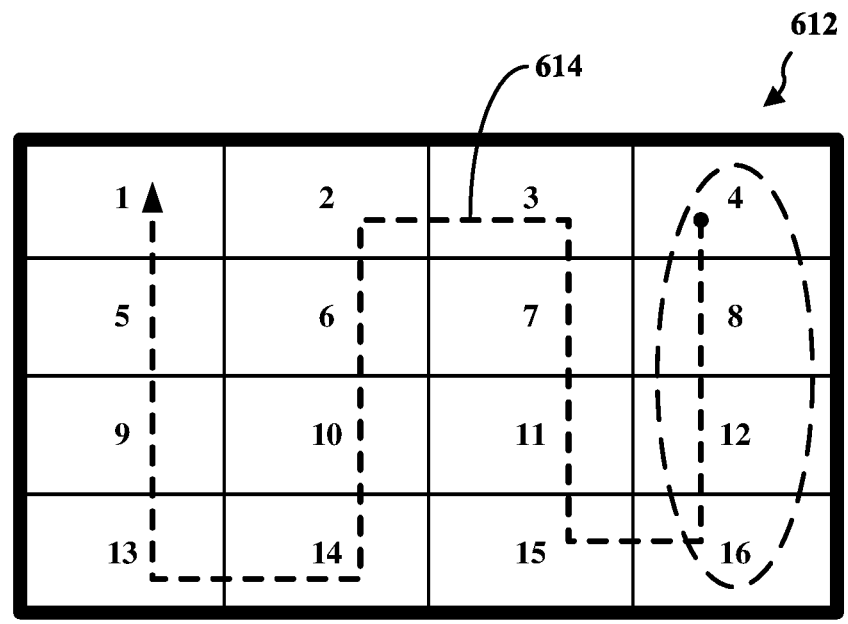
Figure 6D:
Figure 6D:
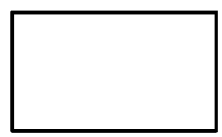
Figure 6D:
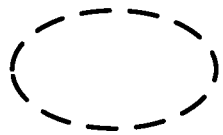

FIG. 6D provides yet another example of a render order 614. In this example, the second processing unit 106 has identified bins 4, 8, 12, and 16 as high priority bins because they overlap the fovea region, while bins 1-3, 5-7, 9-11, and 13-15 are low priority bins because they do not overlap the fovea region. In the example of FIG. 6D, the fovea region is located along the right edge of the frame. FIG. 6D provides another example of a frame where the fovea region is not located at the central region of the frame. In this example, the second processing unit 106 may render the high priority bins in the following order: 4, 8, 12, and 16. Afterwards, the render order 614 continues to the low priority bins, such that the second processing unit 106 can render the low priority bins in the following order: 15, 11, 7, 3, 2, 6, 10, 14, 13, 9, 5, and 1. The render order 606 of FIG. 6D is merely an example, such that many more render orders are possible.

Figure 6E:
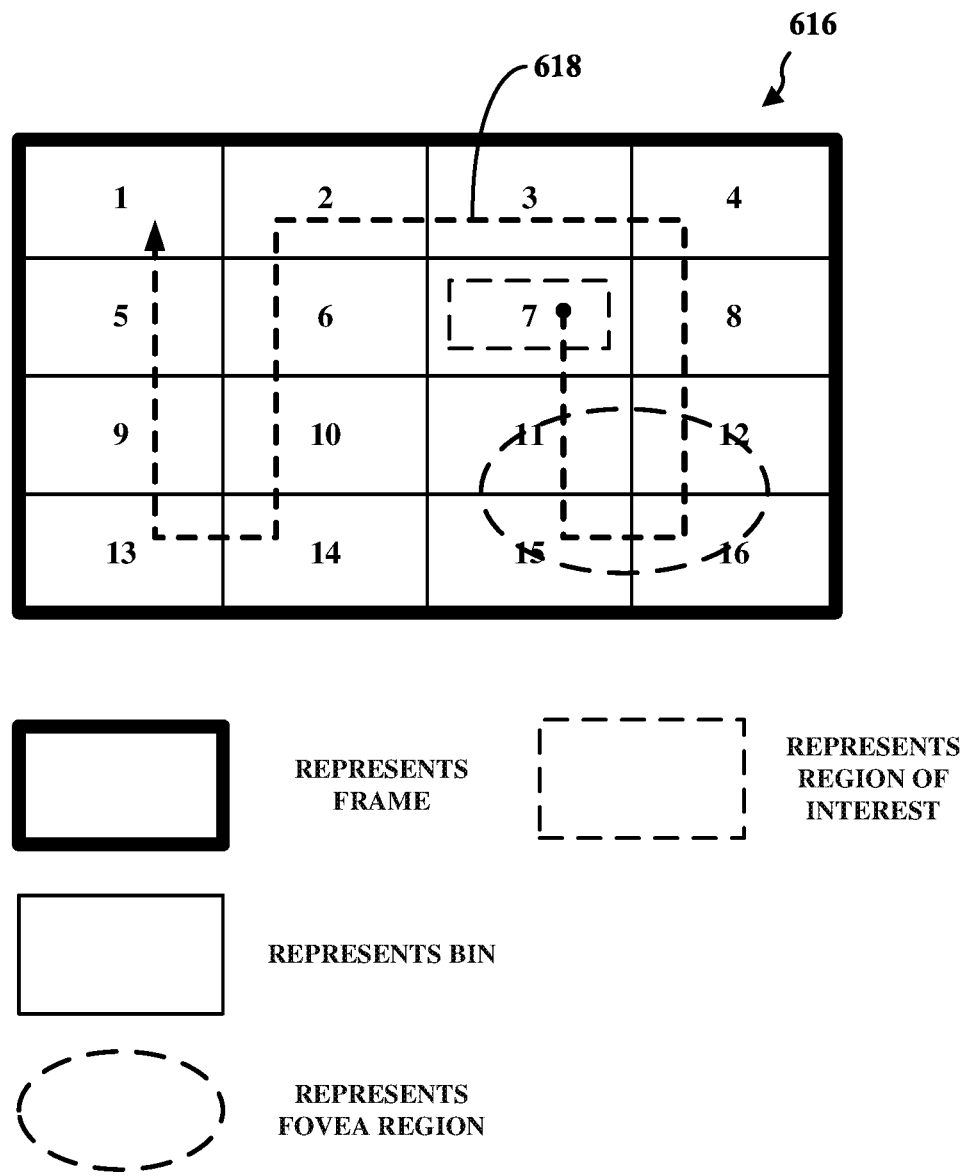

FIG. 6E provides yet another example of a render order 618. In this example, the second processing unit 106 has identified bins 11, 12, 15, and 16 as high priority bins because they overlap the fovea region. The second processing unit 106 may also identify bin 7 as a high priority bin, although being outside of the fovea region. For example, bin 7 may include a region of interest that would require rendering at a high quality. In some aspects, bin 7 may include a flagged graphic object, a manually selected bin, a user interface (U/I) and/or text that would need to be rendered at high quality. In such instances, the second processing unit 106 may receive an indication from the application that a bin (e.g., bin 7), while being outside of the fovea region, is identified as a high priority bin. In some aspects, the second processing unit can receive the indication from the operating system or the VR/AR framework. The second processing unit 106 identifies bins 1-6, 8-10, 13, and 14 as low priority bins, because they do not overlap the fovea region and/or do not include a region of interest that would require rendering at a high quality. In the example of FIG. 6E, the fovea region is located at the bottom right corner of the frame and includes a region of interest that is outside the fovea region. In this example, the second processing unit 106 may render the high priority bins in the following order: 7, 11, 15, 16, and 12. Afterwards, the render order 618 continues to the low priority bins, such that the second processing unit 106 can render the low priority bins in the following order: 8, 4, 3, 2, 6, 10, 14, 13, 9, 5, and 1. The render order of FIG. 6E is merely an example, such that many more render orders are possible.

The commonality between the examples of FIGS. 6A-6E is that the high priority bins are rendered before any of the low priority bins are rendered. As such, the second processing unit 106 will focus its rendering resources to the high priority bins. The high priority bins overlap the fovea region and is the main region of interest for the particular frame and should be rendered at a high resolution. The second processing unit 106 can render the low priority bins at a reduced resolution than the high priority bins, because the portion of the frame represented by the low priority bins is not intended to be the main region of interest for the particular frame. The second processing unit 106 can degrade the quality of one or more of the low priority bins to ensure that the frame will be rendered to meet the frame refresh deadline. For example, the second processing unit 106 can dynamically adjust foveation parameters to ensure that the frame is rendered to meet a frame deadline. In some examples, the second processing unit 106 can display a previously rendered frame in the place of a current frame being processed based on the determination that the rendering time allotment for the current frame being processed will be exceeded. In such example, the entire current frame being processed will not be displayed, but will instead be replaced with the previously rendered frame, even though rendering of one or more high priority bins was performed. In some examples, the second processing unit 106 can skip the rendering of at least one of the one or more low priority bins based on the determination that the rendering time allotment for the frame will be exceeded. In such an example, the second processing unit can display a combination of the rendering of the one or more high priority bins along with the previously rendered low priority bin that are inserted in the place of the skipped low priority bin. Thus, the second processing unit 106 may be configured to more efficiently generate graphical content, such as by dynamically adjusting workload during the frame rendering and maximizing the use of available rendering capabilities.

In accordance with the techniques described herein, the second processing unit 106 may be configured to more efficiently generate graphical content for foveated rendering. For example, the second processing unit 106 may be configured to divide a frame into bins. The second processing unit 106 may be configured to receive information indicative of the eye gaze region. Based on the information indicative of the eye gaze region, the second processing unit 106 may be configured to arrange the frame with respect to a bin layout, such that the frame is divided into multiple bins. The processing unit 106 may be configured to identify each of the bins of the bin layout as either a high priority bin or a low priority bin. In some examples, the bin size of the bins within a bin layout may be the same, different, or a combination thereof. In some examples, the bin layouts include a standard bin layout, where the amount of bins in a column is the same as the amount of bins in a row (e.g., 4×4, 8×8, 16×16, etc.). The second processing unit 106 may be configured to render graphical content for the frame using the bin layout. The disclosure is not intended to be limited to only having high priority and low priority bins, and are merely examples. Some example can include high, medium, low, or any other number of priorities, consistent with the techniques described herein.

In some examples, to determine the bin layout to classify each respective bin of the plurality of bins, the second processing unit 106 may be configured to identify the number of bins that overlap with the fovea region, and identify the number of bins that do not overlap with the fovea region. The bins that overlap with the fovea region can be high priority bins. The bins that do not overlap with the fovea region can be low priority bins. In some examples, the second processing unit 106 may be configured to generate respective visibility information for each of the high priority bins before generating respective visibility information for any of the low priority bins. To render graphical content for the frame using the bins, the second processing unit 106 may be configured to render the graphical content based on the respective visibility information for each of the high priority bins and the respective visibility information for the low priority bins. The graphical content for the high priority bins being rendered before any of the low priority bins. In such examples, the second processing unit 106 may be configured to determine a rendering time allotment for the frame. The processing unit may determine a rendering time for each of the low priority bins. The second processing unit 106 may be configured to determine whether the rendering time allotment for the frame will be exceeded based on an amount of the rendering time for zero or more of the low priority bins. The second processing unit 106 may be configured to render graphical content for at least one or more of the low priority bins at a first quality or a second quality, based on the determination of whether the rendering time allotment for the frame will be exceeded. The first quality can be lower than the second quality.

The bin layout selection occurs before a binning pass in which visibility information is generated for each bin of the selected bin layout. The second processing unit 106 may be configured to divide a framebuffer into multiple bins based on the selected bin layout. The second processing unit 106 may be configured to render graphical content for the framebuffer using the bins of a selected bin layout. These techniques may be referred to as the second processing unit 106 being configured to perform dynamic bin selection for foveated rendering in which a bin layout is selected from multiple bin layouts based on the information indicative of an eye gaze region. In some examples, the selected bin layout may have the least number of bins that overlap with the eye gaze region of the bin layouts. The selected bin layout may therefore be referred to as an optimal bin layout in some examples. For example, when adaptive rendering technique is used for foveated rendering, the bins overlapping with the eye gaze region may be rendered using a higher sample level than bins that do not overlap with the eye gaze region. In such an example, a fixed bin layout is may not be optimal from a performance and/or power consumption perspective because performing spatial anti-alias rendering with a higher sample level consumes more processing resources and power relative to performing spatial anti-alias rendering with a lower sample level. By dynamically selecting a bin layout based on information indicative of an eye gaze region, the performance of the second processing unit 106 is improved because less bins may be processed using a higher sample level. The second processing unit 106 may be configured to select a bin layout prior to a binning pass being performed.

As an example, FIG. 6A illustrates an example frame 600 with a fovea region overlapping bins according to a first bin layout. FIG. 6B illustrates an example frame 604 with a fovea region overlapping bins according to a second bin layout. FIG. 6C illustrates an example frame 608 with a fovea region overlapping according to a third bin layout. FIG. 6D illustrates an example frame 612 with a fovea region overlapping bins according to a fourth bin layout. In the examples shown, the dimensions are the same for the frames 600, 604, 608, and 612, and the bins have the same dimensions. However, the disclosure is not intended to be limited to this example, and other bin layouts may be used, consistent with the techniques described herein. In some aspects, the dimensions of the frames can be the same or different. In some aspects, the bins in any of the bin layouts can have the same dimension or can have different dimensions. In yet some aspects, any of the bin layouts can include bins having non-uniform dimensions. In the example of FIG. 6A, the first bin layout includes 16 bins and bins 6, 7, 10, and 11 overlap with the fovea region. In the example of FIG. 6B, the second bin layout includes 16 bins and bins 2, 3, 6, 7, 10, and 11 overlap with the fovea region. In the example of FIG. 6C, the third bin layout includes 16 bins and bins 5, 6, 9, 10, 13, and 14 overlap with the fovea region. In the example of FIG. 6D, the fourth bin layout includes 16 bins and bins 4, 8, 12, and 16 overlap with the fovea region.

To select the bin layout, the second processing unit 106 may be configured to select the bin layout among multiple bin layouts that includes the least number of bins that overlap with the eye gaze region relative to the other bin layouts. In the examples of FIGS. 6A and 6B, the second processing unit 106 may be configured to determine a respective number of bins that overlap with the fovea region for each respective bin layout. For example, the second processing unit 106 may be configured to determine that the first bin layout includes 4 bins that overlap with the eye gaze region and determine that the second bin layout includes 6 bins that overlap with the eye gaze region. The second processing unit 106 may be configured to compare the respective numbers of bins that overlap with the eye gaze region corresponding to each respective bin layout to determine which bin layout has the least number of bins that overlaps with the eye gaze region. For example, in the examples of FIGS. 6A and 6B, the second processing unit 106 may be configured to determine that the respective number of bins that overlap with the eye gaze region for the second bin layout is greater than the respective number of bins that overlap with the eye gaze region for the first bin layout.

In accordance with the techniques described herein, the second processing unit 106 may be configured to dynamically adjust foveation parameters for foveated rendering based on information indicative of an eye gaze region. Dynamically adjusting foveation parameters enables more efficient generation of graphical content using foveated rendering by, for example, determining whether the quality of low priority bins needs to be reduced to ensure meeting the display refresh deadline. A determination that the quality of one or more low priority bins needs to be reduced can occur between each of the low priority bins. The one or more low priority bins can be rendered at a reduced quality based on a determination that a rendering time allotment for the frame will be exceeded.

Figure 7:
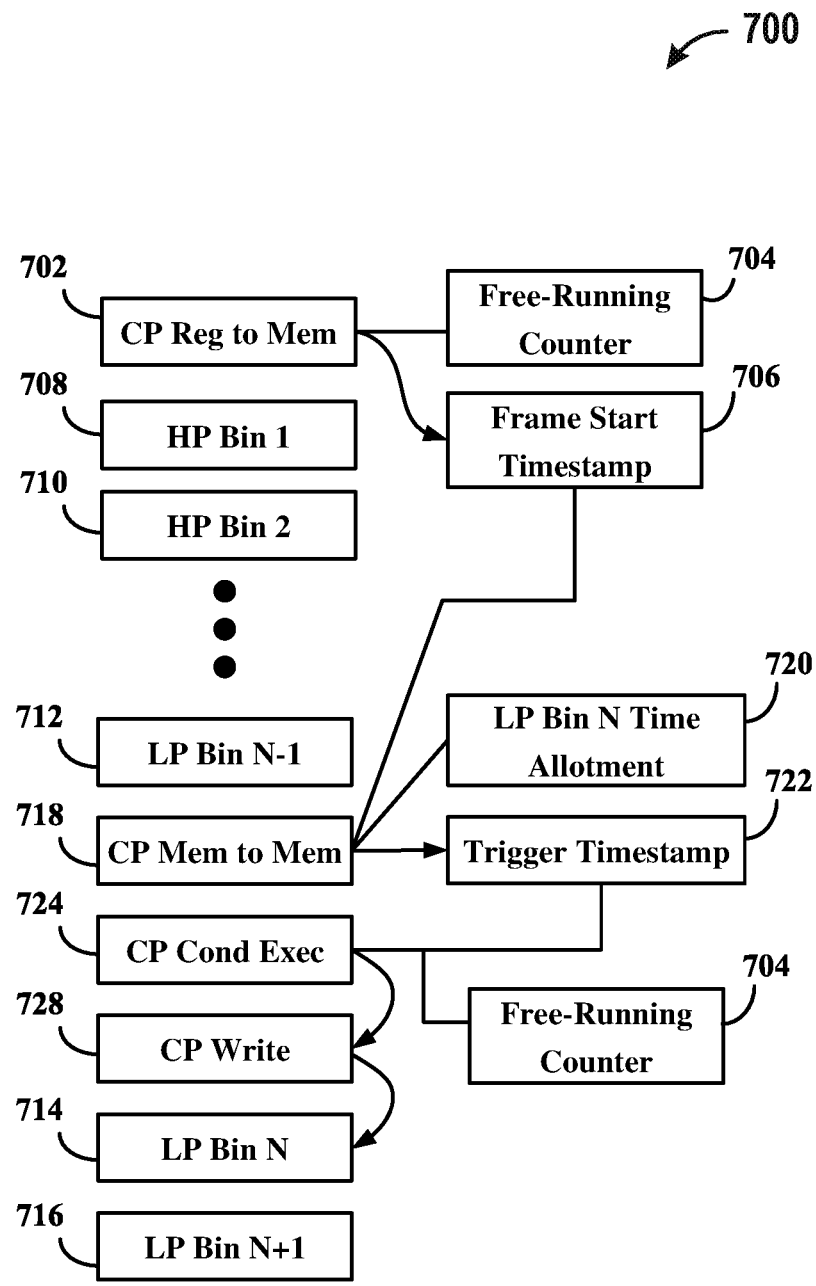
FIG. 7 illustrates an example of a determination as to whether to perform dynamic adjustment based on foveation parameters in accordance with the techniques of this disclosure.

As an example, FIG. 7 illustrates an example 700 of a determination as to whether to perform dynamic adjustment based on foveation parameters in accordance with the techniques of this disclosure. The example 700 shows a method of doing mid-frame adaption using command processor (CP) commands within the command stream. Before the frame rendering commences, the second processing unit 106 uses a time reference to track the timing of the rendering process. Free-Running Counter 704 is a counter that can be utilized for timing the elapsed duration and can provide a start time of the frame rendering. The command processor register to memory (CP Reg to Mem) 702 reads from the Free-Running Counter 704 and stores the value (e.g., Frame Start Timestamp 706) in memory, at which point the high priority (HP) bins 708, 710 may be rendered. After the high priority bins 708, 710 are rendered, the low priority (LP) bins 712, 714, 716 may be rendered.

The reference Frame Start Timestamp 706 initiated during the rendering of the high priority bins is read by the command processor memory to memory (CP Mem to Mem) 718. LP Bin Time Allotment 720 may provide a projected rendering time allotment for a low priority bin (e.g., LP Bin N 714) calculated by the CP Mem to Mem 718. The LP Bin Time Allotment 720 can be a pre-estimated time allotment to render specific low priority bins, LP Bin N 714 in the example of FIG. 7. The rendering time allotment of the bins can be estimated in view of the size of the final image. In some examples, the amount of workload per bin will be non-uniform such that some bins may use more rendering time than other bins to complete. The pre-estimated time allotment 720 can be determined ahead of time, on a per bin basis, and can be based on visible primitives. In some examples, the pre-estimated time allotment 720 can be based on the number of primitives in the bin, the render time of the same bin in a previous rendered frame, or can be provided from the application. There are many other factors that can be used to determine the pre-estimated time allotment, and the disclosure is not intended to be limited to the examples provided herein. The pre-estimated time allotment 720 can provide an estimated render time at any bin to determine if the remaining render time is sufficient to complete the rendering of the frame before the render deadline. If it is determined that the render deadline will not be met, then the quality of one or more of the low priority bins can be reduced to make up the time difference.

The CP Mem to Mem 718 can add the LP Bin N Time Allotment 720 to the Frame Start Timestamp 706 to determine a projected render time for LP Bin N 712. This projected render time can be compared with a Trigger Timestamp 722. The Trigger Timestamp 722 can be a trigger time for a specific bin, LP Bin N 714 in the example of FIG. 7. If the projected render time exceeds the Trigger Timestamp 722, then the command processor conditional execute (CP Cond Exec) 724 will execute a different set of commands. The CP Cond Exec 724 is configured to conditionally execute sets of commands based on whether the elapsed render time, as indicated in Free-Running Counter 704, is over the threshold or whether the render time is not over the threshold time. If the render time is not over the threshold time, then the CP Cond Exec 724 operates normally (e.g., without adjusting render quality/level of detail), which means that the CP Cond Exec 724 executes the commands to set up the next bin, LP Bin N+1 716 in the example of FIG. 7, for the expected level of detail predetermined from the beginning of the current frame rendering process. However, if the render time is over the threshold time, then the CP Cond Exec 724 can operate another set of commands to lower the level of detail of the next bin, LP Bin N+1 716. The CP Cond Exec 724 can inject a new set of commands between bins when certain circumstances are met, such as but not limited to the elapsed render time exceeding a predetermined time allotment, or if the projected time to render the remaining bins would exceed the render deadline. The CP Cond Exec 724 can adjust the next bin's rendering in order to meet the render deadline. For example, the CP Cond Exec 724 can instruct CP Write 728 to reprogram the next bin to be a lower quality or resolution. Based on the instructions, the CP Write 728 can execute a block of commands that reprograms the next bin. The CP Write 728 provides a block of CP commands that patches (e.g., adjusts or rewrites) the next bin's command buffer with the new set of commands to reduce the quality or resolution. For example, if the next bin was set to render at a particular resolution, the CP Write 728 can provide the commands that the CP would execute to the command stream of the next tile, change the instructions stored in a register associated with the next tile with the new set of commands and set up the new/reduced level of quality, thereby dynamically adjusting the frame rendering. As such, CP Cond Exec 724 can dynamically adjust the rendering parameters such that the frame will render in time to meet the render deadline. In some examples, the determination of whether to degrade the quality of any of the low priority bins occurs between each of the low priority bins. However, in some examples, the determination of whether to degrade the quality of any of the low priority bins can occur in different occasions and is not intended to be limited to the above examples. In some aspects, the determination can be performed for every other low priority bin, a random selection of one or more of the low priority bins, or at least one of the low priority bins.

FIG. 7 depicts the blocks involved in an example determination of whether to degrade the second bin of the low priority bins (or LP Bin N 714), as only being between LP Bin N−1 712 and LP Bin N 714. However, these blocks can be between each of the low priority bins and is not limited to only being between LP Bin N−1 and LP Bin N. In some instances, the dynamic ability to degrade the quality of the low priority bins allows the rendering process to complete within the deadline.

Referring back to FIG. 1, the third processing unit 108 may be configured to perform one or more display processing processes 122 in accordance with the techniques described herein. For example, the third processing unit 108 may be configured to perform one or more display processing techniques on one or more frames generated by the second processing unit 106 before presentment by the display 103. Otherwise described, the third processing unit 108 may be configured to perform display processing. In some examples, the one or more display processing processes 122 may include one or more of a rotation operation, a blending operation, a scaling operating, any display processing process/operation, or any process/operation described herein.

In some examples, the one or more display processing processes 122 include any process/operation described herein with respect to the third processing unit 108. The display 103 may be configured to display content that was generated using the display processing pipeline 102. For example, the second processing unit 106 may generate graphical content based on commands/instructions received from the first processing unit 104. The graphical content may include one or more layers. Each of these layers may constitute a frame of graphical content. The third processing unit 108 may be configured to perform composition on graphical content rendered by the second processing unit 106 to generate display content. Display content may constitute a frame for display. The frame for display may include two or more layers/frames that were blended together by the third processing unit 108.

The device 100 may include or be connected to one or more input devices 113. In some examples, the one or more input devices 113 may include one or more of: a touch screen, a mouse, a peripheral device, an audio input device (e.g., a microphone or any other visual input device), an eye gaze input device 113-1 (which may be referred to as an eye gaze tracker, an eye tracker, an eye gaze sensor, eye movement tracker, an eye movement sensor, an eye sensor, or the like), a visual input device (e.g., an eye gaze input device 113-1, a camera, an eye tracker, or any other visual input device), any user input device, or any input device configured to receive an input from a user. In some examples, the display 103 may be a touch screen display; and, in such examples, the display 103 constitutes an example input device 113.

In the example of FIG. 1A, the one or more input devices 113 is shown as including an eye gaze input device 113-1. The eye gaze input device 113-1 may be configured to determine where a user of device 100 is looking, such as where a user is looking on a display (e.g., the display 103). Otherwise described, the eye gaze input device 113-1 may be configured to generate information indicative of an eye gaze region. The eye gaze region may be a region where the user of the device 100 is looking. In some examples, the eye gaze region may be referred to as a fovea/foveated region or a fixation point region. The information indicative of an eye gaze region may include information indicative of one or more regions, such as the eye gaze region (e.g., a fovea region) and/or one or more regions outside of the eye gaze region (e.g., a peripheral region). In some examples, the peripheral region may be the region that falls outside of the eye gaze region.

The eye gaze input device 113-1 may be configured to provide the information indicative of the eye gaze region (e.g., the fovea region) to the first processing unit 104 and/or the second processing unit 106. In some examples, the first processing unit 104 may be configured to receive the information indicative of the eye gaze region from the eye gaze input device 113-1 and further process the information to generate processed information indicative of the eye gaze region. For example, the first processing unit 104 may be configured to adjust the size of the eye gaze region corresponding to the information indicative of the eye gaze region received from the eye gaze input device 113-1. In other examples, the first processing unit 104 may be configured to receive the information indicative of the eye gaze region from the eye gaze input device 113-1 and forward it to the second processing unit 106. In accordance with the techniques described herein, the second processing unit 106 may be configured to receive information indicative of an eye gaze region from any component, such as the first processing unit 104 or the eye gaze input device 113-1. The information indicative of an eye gaze region received by the second processing unit 106 may be generated by the eye gaze input device 113-1 and processed by zero or more other components before being received by the second processing unit 106.

It is understood that the output of an input device may constitute an input to a component receiving the output from the input device. The eye gaze input device 113-1 may be integrated with the device 100 so that the eye gaze input device 113-1 is configured to detect where a user is looking relative to the display 103.

The display processing pipeline 102 may be configured to execute one or more applications. For example, the first processing unit 104 may be configured to execute one or more applications 120. The first processing unit 104 may be configured to cause the second processing unit 106 to generate content for the one or more applications 120 being executed by the first processing unit 104. Otherwise described, execution of the one or more applications 120 by the first processing unit 104 may cause the generation of graphical content by a graphics processing pipeline 111. For example, the first processing unit 104 may issue or otherwise provide instructions (e.g., draw instructions) to the second processing unit 106 that cause the second processing unit 106 to generate graphical content based on the instructions received from the first processing unit 104. The second processing unit 106 may be configured to generate one or more layers for each application of the one or more applications 120 executed by the first processing unit 104. Each layer generated by the second processing unit 106 may be stored in a buffer (e.g., a framebuffer). Otherwise described, the buffer may be configured to store one or more layers of graphical content rendered by the second processing unit 106. The buffer may reside in the internal memory 107 of the second processing unit 106 and/or the memory 110 (which may be system memory of the device 100 in some examples). Each layer produced by the second processing unit 106 may constitute graphical content. The one or more layers may correspond to a single application or multiple applications. The second processing unit 106 may be configured to generate multiple layers of content, meaning that the first processing unit 104 may be configured to cause the second processing unit 106 to generate multiple layers of content.

Figure 2A:
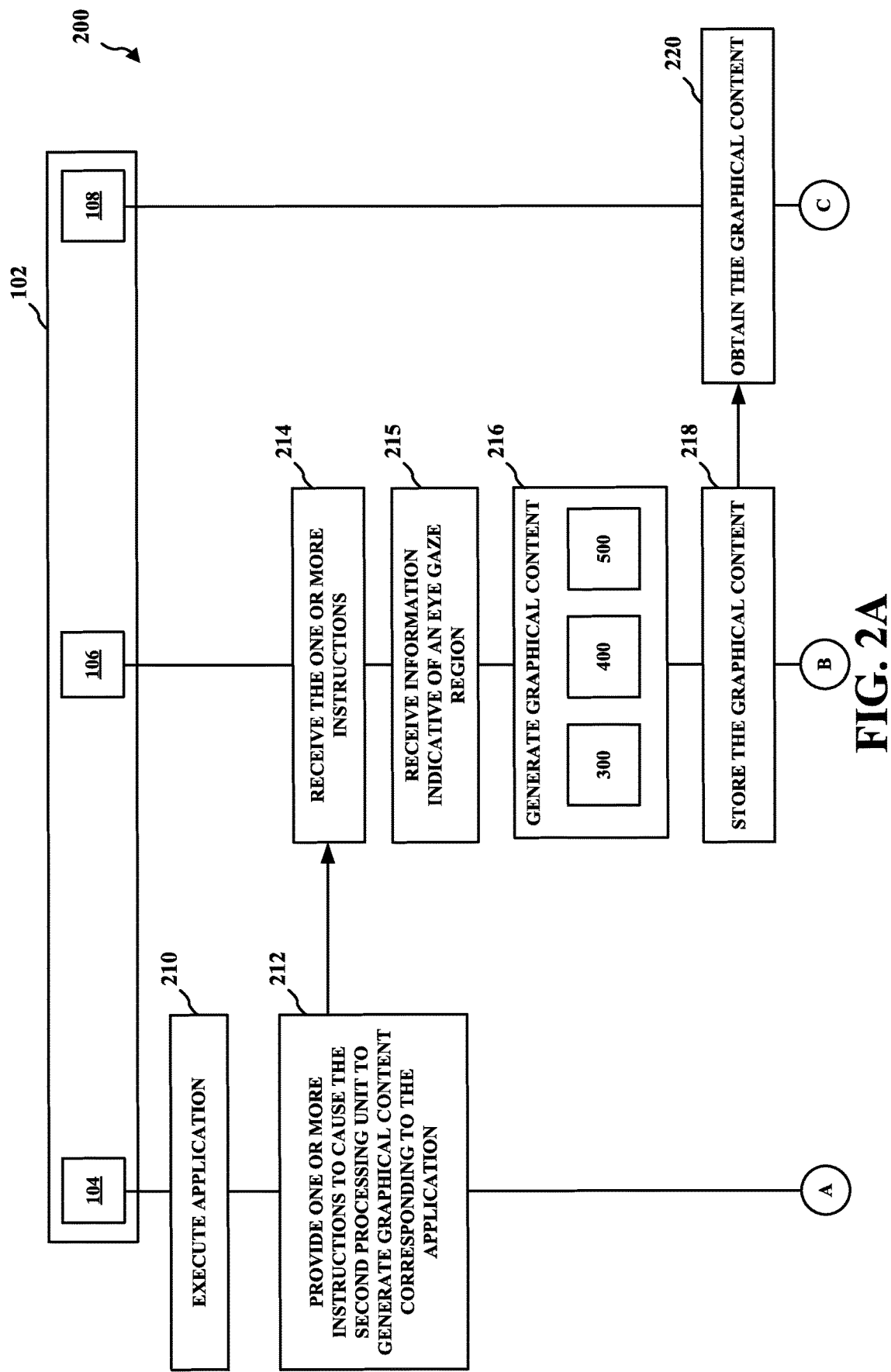
FIGS. 2A-2B illustrate an example flow diagram in accordance with the techniques of this disclosure.
Figure 2B:
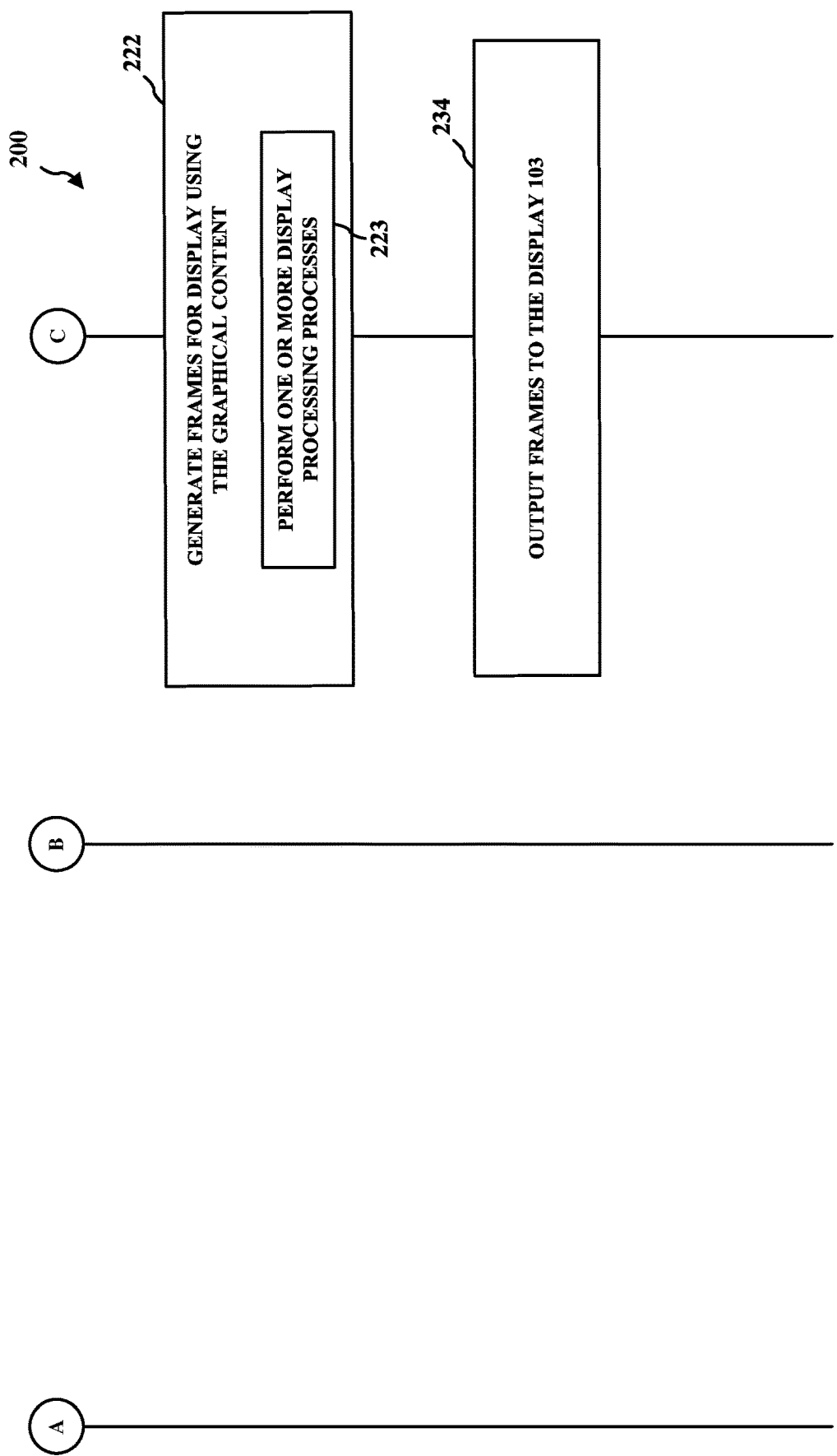

FIGS. 2A-B illustrate an example flow diagram 200 in accordance with the techniques of this disclosure. In other examples, one or more techniques described herein may be added to the flow diagram 200 and/or one or more techniques depicted in the flow diagram may be removed. One or more blocks shown in FIGS. 2A-B may be performed in parallel.

In the example of FIGS. 2A-B, at block 210, the first processing unit 104 may be configured to execute an application. At block 212, the first processing unit 104 may be configured to provide one or more instructions to the second processing unit 106 to cause the second processing unit 106 to generate graphical content corresponding to the application. At block 214, the second processing unit 106 may be configured to receive the one or more instructions. At block 215, the second processing unit 106 may be configured to receive information indicative of an eye gaze region (e.g., a fovea region). In some examples, the second processing unit 106 may be configured to receive information indicative of an eye gaze region from the first processing unit 104 and/or the eye gaze input device 113-1.

At block 216, the second processing unit 106 may be configured to generate the graphical content based on the one or more instructions received from the first processing unit 104 and based on the information indicative of the eye gaze region. For example, the second processing unit 106 may be configured to generate the graphical content at block 216 in accordance with one or more techniques described herein, such as in accordance with the example flowchart 300, the example, flowchart 400, and/or the example flowchart 500. The graphical content may include one or more frames.

At block 218, the second processing unit 106 may be configured store the generated graphical content (e.g., in the internal memory 107 and/or the memory 110) as described herein. Therefore, block 218 generally represents that rendered graphical content may be stored in one or more memories during rendering. For example, the second processing unit 106 may be configured to use the internal memory 107 and/or the memory 110 to store rendered graphical content. To the extent the internal memory 107 is used to store rendered graphical content, the second processing unit 106 may be configured store the rendered graphical content from the internal memory 107 to the memory 110. The location in the memory 110 at which the rendered graphical content is stored may be referred to as a framebuffer.

At block 220, the third processing unit 208 may be configured to obtain the generated graphical content from a framebuffer. For example, the third processing unit 208 may be configured to obtain one or more frames of generated graphical content from the memory 110. At block 222, the third processing unit 208 may be configured to generate frames for display using the generated graphical content obtained from the framebuffer. To generate display content, the third processing unit 108 may be configured to perform one or more display processing processes 223 (e.g., composition display processes, such as blending, rotation, or any other composition display process) on the generated graphical content read from the framebuffer. At block 234, the third processing unit 108 may be configured to output display content to the display 103.

Figure 3:
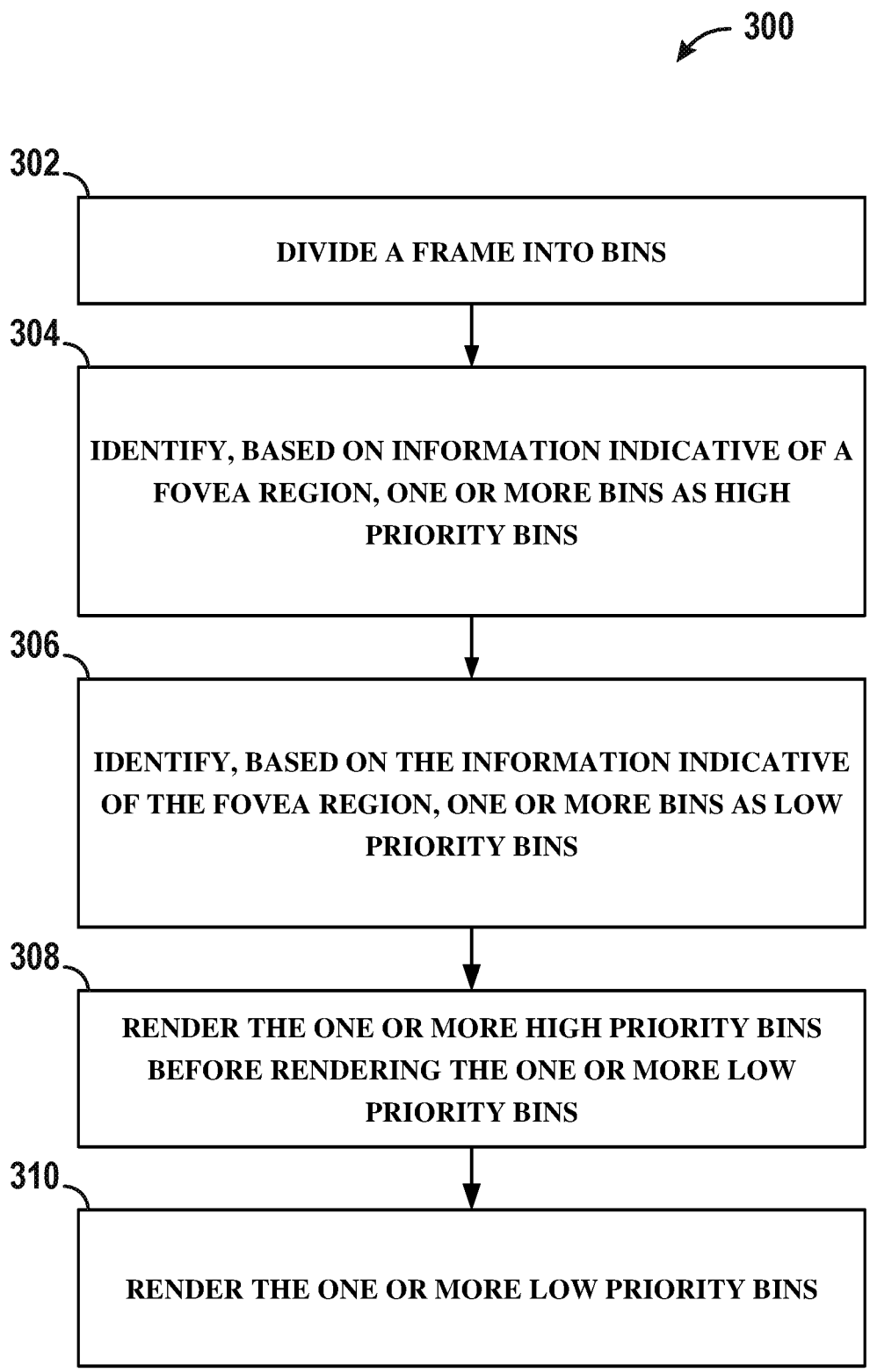
FIG. 3 illustrates an example flowchart of an example method in accordance with the techniques of this disclosure.

FIG. 3 illustrates an example flowchart 300 of a method in accordance with the techniques of this disclosure. The method may be performed by the second processing unit 106. In some examples, the method illustrated in flowchart 300 may include one or more functions described herein that are not illustrated in FIG. 3, and/or may exclude one or more illustrated functions.

At block 302, the second processing unit 106 may be configured to divide a frame into bins. At block 304, the second processing unit 106 may be configured to identify, based on the information indicative of a fovea region, one or more bins as high priority bins. At block 306, the second processing unit 106 may be configured to identify, based on the information indicative of the fovea region, one or more bins as low priority bins.

To identify one or more bins as high priority bins, the second processing unit 106 may be configured to determine that a first bin overlaps with the fovea region. To identify one or more bins as low priority bins, the second processing unit 106 may be configured to determine that a second bin does not overlap with the fovea region. To identify one or more bins as low priority bins, the second processing unit 106 may be configured to determine which of the one or more low priority bins can have a sacrificed quality, such that the one or more low priority bins are rendered at a lower quality than high priority bins and/or at a lower quality than a full quality (e.g., a highest quality for the bin, an original quality for the bin, a pre-set quality for the bin, a quality of the content received to render, etc.).

At block 308, the second processing unit 106 may be configured to render the one or more high priority bins before rendering the one or more low priority bins. The one or more high priority bins can be rendered into a first memory. At block 310, the second processing unit 106 may be configured to render the one or more low priority bins. The one or more low priority bins can be rendered into the first memory. The first memory may be the internal memory 107 or may be the memory 110. To render the frame, which includes the one or more high priority bins and the one or more low priority bins, the second processing unit 106 may be configured to use bin-based rendering. In such examples, the second processing unit may be configured to perform one or more render passes to render the frame.

In some examples, the second processing unit 106 may be configured to render the one or more low priority bins after the one or more high priority bins have been rendered. In such examples, to render the one or more low priority bins, the second processing unit 106 may be configured to render at least one of the one or more low priority bins at a first quality lower than a second quality at which the one or more high priority bins were rendered.

In some examples, the second processing unit 106 may be configured to render zero or more of the one or more low priority bins. In some examples, the second processing unit 106 may be configured to determine a rendering time allotment for the frame. In such examples, the second processing unit 106 may be configured to determine that the rendering time allotment for the frame will be exceeded based on an amount of time used to render the one or more high priority bins and the zero or more of the one or more low priority bins. In such examples, the second processing unit 106 may be configured to render, based on the determination that the rendering time allotment for the frame will be exceeded, at least one of the one or more low priority bins at a first quality instead of a second quality. The first quality may be lower than the second quality.

In some examples, the second processing unit 106 may be configured to determine whether the rendering time allotment for the frame will be exceeded between each of the zero or more of the one or more low priority bins. To render the at least one of the one or more low priority bins at the first quality, the second processing unit 106 may be configured to dynamically adjust foveation parameters to ensure that the frame is rendered to meet a frame deadline. In some examples, the second processing unit 106 may be configured to display a previously rendered frame in the place of the frame being processed based on the determination that the rendering time allotment for the frame being processed will be exceeded. In some examples, the second processing unit 106 may be configured to skip the rendering of at least one of the one or more low priority bins based on the determination that the rendering time allotment for the frame will be exceeded. The rendering time allotment for the frame can be based on a quantity of primitives in a current bin being rendered, rendering time of a previous bin, or a pre-determined estimation. To determine the rendering time allotment for the frame, the second processing unit 106 may be configured to compare a time allotment for each of the one or more low priority bins with a trigger timestamp. In such examples, the second processing unit 106 may be configured to determine that the time allotment for one of the one or more low priority bins exceeds the trigger timestamp. In such examples, the second processing unit 106 may be configured to render an immediately following low priority bin at the first quality.

Figure 4:
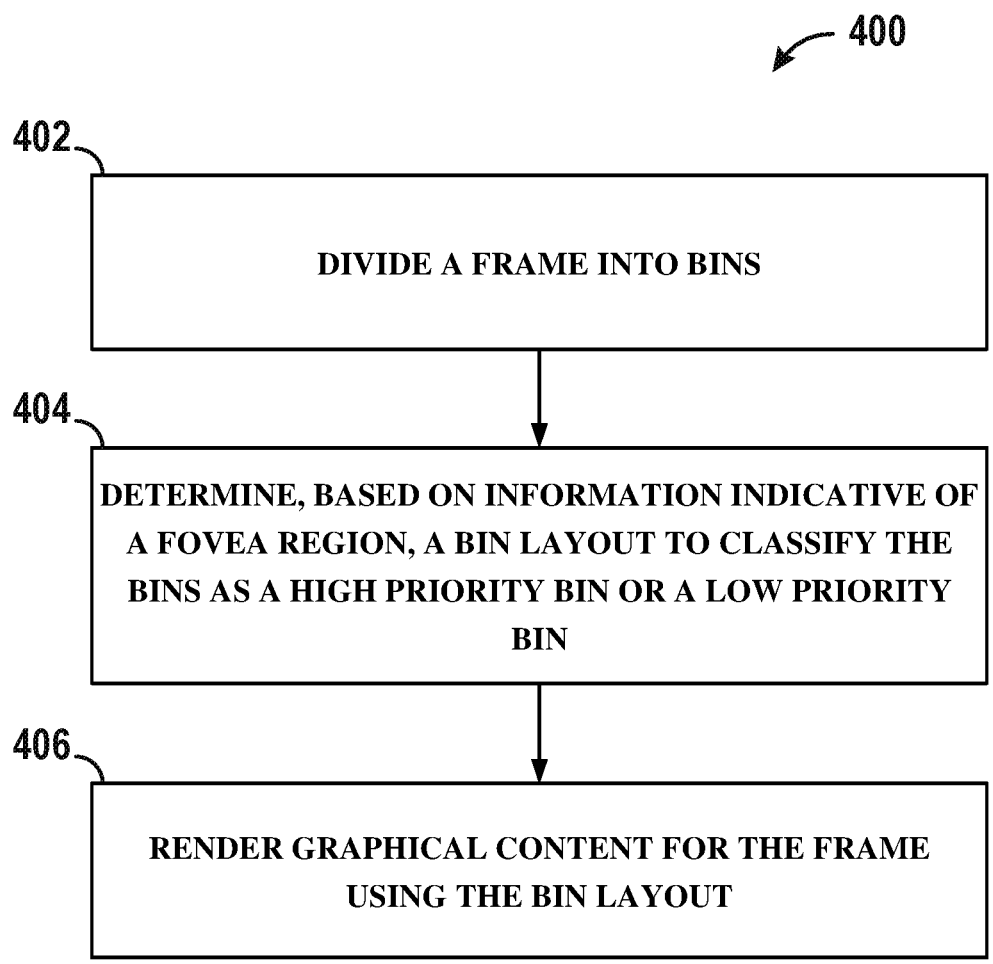
FIG. 4 illustrates an example flowchart of an example method in accordance with the techniques of this disclosure.

FIG. 4 illustrates an example flowchart 400 of a method in accordance with the techniques of this disclosure. The method may be performed by the second processing unit 106. In some examples, the method illustrated in flowchart 400 may include one or more functions described herein that are not illustrated in FIG. 4, and/or may exclude one or more illustrated functions.

At block 402, the second processing unit 106 may be configured to divide a frame into bins. At block 404, the second processing unit 106 may be configured to determine, based on information indicative of a fovea region, a bin layout to classify each respective bin as either a high priority bin or a low priority bin. At block 406, the second processing unit 106 may be configured to render graphical content for the frame using the bin layout.

In some examples, to determine the bin layout to classify each respective bin, the second processing unit 106 may be configured to identify which bins overlap with the fovea region, and identify which bins do not overlap with the fovea region. The bins that overlap with the fovea region in this example, can be identified as high priority bins. The bins that do not overlap with the fovea region in this example, can be identified as low priority bins.

In some examples, the second processing unit 106 may be configured to generate respective visibility information for each of the high priority bins before generating respective visibility information for any of the low priority bins. In some examples, the second processing unit 106 may be configured to generate the respective visibility information for each of the low priority bins after generating the respective visibility information for each of the high priority bins. In some examples, to render graphical content for the frame using the bin layout the second processing unit 106 may be configured to render the graphical content for the high priority bins before the low priority bins. The graphical content for the high priority bins may be rendered before any of the low priority bins.

In some examples, the second processing unit 106 may be configured to determine a rendering time allotment for the frame. The second processing unit 106 may be configured to determine a rendering time for each of the low priority bins. In some examples, the second processing unit 106 may be configured to determine whether the rendering time allotment for the frame will be exceeded based on an amount of the rendering time remaining for zero or more of the low priority bins. In such examples, the second processing unit 106 may be configured to render, based on the determination of whether the rendering time allotment for the frame will be exceeded, graphical content for at least one or more of the low priority bins at a first quality instead of a second quality. The first quality may be lower than the second quality.

Figure 5:
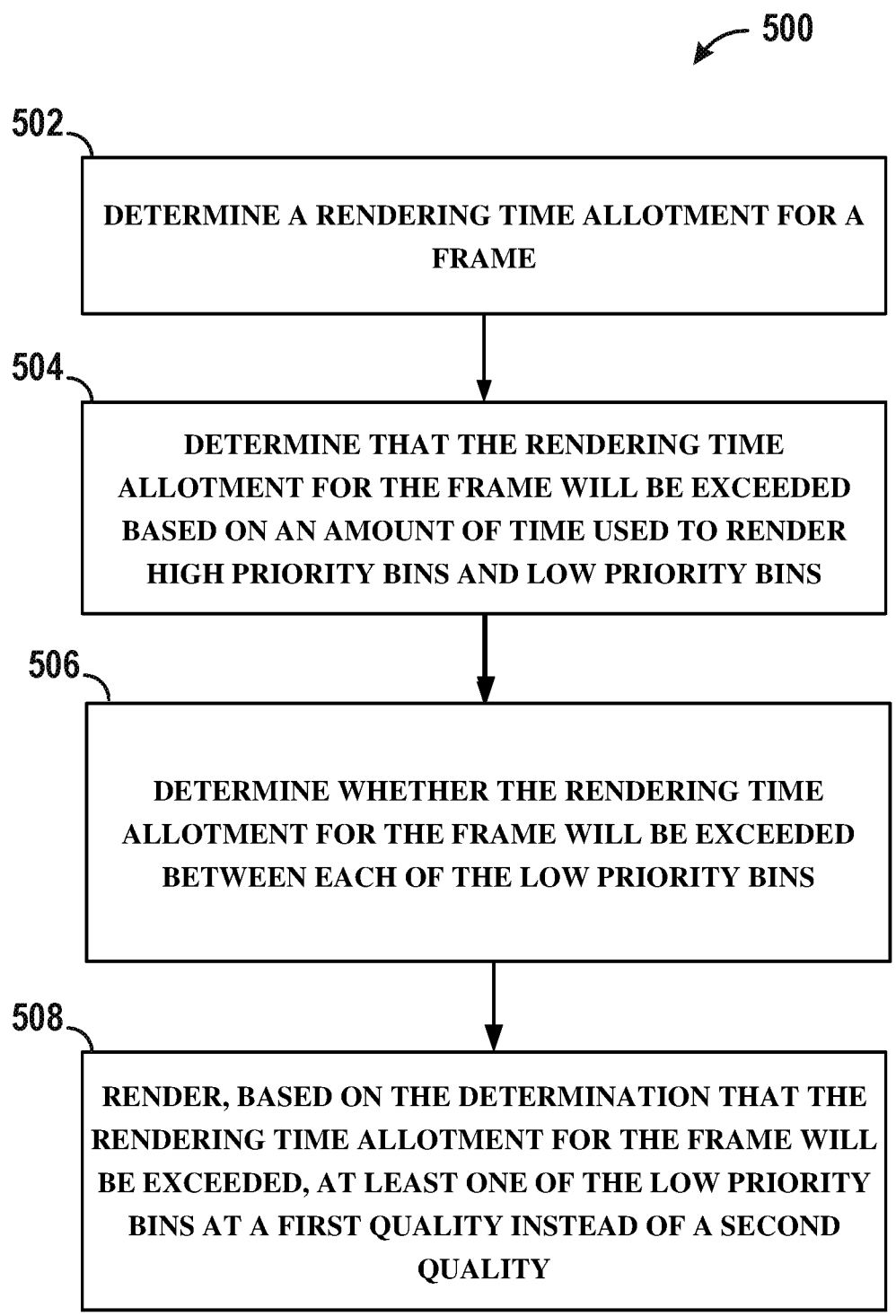
FIG. 5 illustrates an example flowchart of an example method in accordance with the techniques of this disclosure.

FIG. 5 illustrates an example flowchart 500 of a method in accordance with the techniques of this disclosure. The method may be performed by the second processing unit 106. In some examples, the method illustrated in flowchart 500 may include one or more functions described herein that are not illustrated in FIG. 5, and/or may exclude one or more illustrated functions.

At block 502, the second processing unit 106 may be configured to determine a rendering time allotment for a frame. The render time allotment can be a pre-estimated time allotment to render specific low priority bins. The render time allotment of the bins can be based on the size of the final image. In some examples, the amount of workload per bin will be non-uniform such that some bins may use more rendering time than other bins to complete. The render time allotment can be determined ahead of time, on a per bin basis or universally for all the bins, and can be based on visible primitives. In some examples, the render time allotment can be based on the number of primitives in the bin, the render time of the same bin in a previous rendered frame, or can be provided from the application. There are other factors that can be used to determine the render time allotment, and the disclosure is not intended to be limited to the examples provided herein. The render time allotment can provide an estimated render time at any bin to determine if the remaining render time is sufficient to complete the rendering of the frame before the render deadline. At block 504, the second processing unit 106 may be configured to determine that the rendering time allotment for the frame will be exceeded based on an amount of time used to render high priority bins and low priority bins. The render time allotment can be added to a start timestamp that provides a starting reference time to provide a projected render time at a specific bin. The projected render time can be compared to a trigger time of the low priority bin being rendered, in order to determine if the render time of the low priority bin being rendered exceeds an estimated render time.

At block 506, the second processing unit 106 may be configured determine whether the rendering time allotment for the frame will be exceeded between each of the low priority bins. The projected render time of one of the low priority bins can be compared to a trigger time of the respective low priority bins. Each low priority bin can have a specific trigger time and can be compared to the projected render time for the specific bin. If the projected render time exceeds the trigger time, then the rendering time allotment for the frame will be exceeded and may miss the frame refresh render deadline.

At block 508, the second processing unit 106 may be configured to render, based on the determination that the rendering time allotment for the frame will be exceeded, at least one of the low priority bins at a first quality instead of a second quality. Upon the determination that the rendering time allotment for the frame will be exceeded, the quality of at least one of the low priority bins can be reduced. The quality can be reduced such that the at least one of the low priority bins is rendered at a first quality instead of a second quality. The second quality is the quality which the low priority bins would be rendered at under normal operations. However, the first quality is less than the second quality, and reduces the render time of the at least one of the low priority bins in order to render the frame in time for the refresh deadline.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, it is understood that such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more DSPs, general purpose microprocessors, ASICs, ALUs, FPGAs, or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for rendering graphics content, comprising:
a memory; and
at least one processing unit coupled to the memory and configured to:
receive information indicative of a fovea region; and
render a frame using bin-based rendering, wherein to render the frame using bin-based rendering the at least one processing unit is configured to:
divide the frame into a plurality of bins;
identify, based on the information indicative of the fovea region, one or more high priority bins of the plurality of bins;
identify, based on the information indicative of the fovea region, a plurality of low priority bins of the plurality of bins; and
render the one or more high priority bins before the plurality of low priority bins are rendered;
prior to rendering when a low priority bin of the plurality of one or more low priority bins is rendered, determine a rendering time allotment for the frame;
determine whether the rendering time allotment for the frame will be exceeded between each of the plurality of low priority bins;
determine that the rendering time allotment for the frame will be exceeded based on an amount of time needed to render the one or more high priority bins and the plurality of low priority bins; and
render at least one of the plurality of low priority bins at a first quality instead of a second quality based on the determination that the rendering time allotment for the frame will be exceeded, wherein the first quality is lower than the second quality.

2. The apparatus of claim 1, wherein the at least one processing unit is configured to:

skip rendering of at least one of the plurality of low priority bins based on the determination that the rendering time allotment for the frame will be exceeded; and output one or more previously rendered bins from a previously rendered frame in place of the skipped at least one of the plurality low priority bins.

3. The apparatus of claim 2, wherein the one or more previously rendered bins are low priority bins.

4. The apparatus of claim 1, wherein to render the one or more high priority bins, the at least one processing unit is configured to render the one or more high priority bins at the second quality.

5. The apparatus of claim 1, wherein to render the at least one of the plurality of low priority bins at the first quality, the at least one processing unit is configured to:
dynamically adjust foveation parameters to ensure that the frame is rendered to meet the rendering time allotment.

6. The apparatus of claim 1, wherein the at least one processing unit is configured to:
display a previously rendered frame in the place of a second frame based on a determination that a rendering time allotment for the second frame will be exceeded.

7. The apparatus of claim 1, wherein to determine the rendering time allotment for the frame is based on a quantity of primitives in a current bin being rendered, rendering time of a previous bin, or a pre-determined estimation.

8. The apparatus of claim 1, wherein to determine the rendering time allotment for the frame, the at least one processing unit is configured to:
compare a time allotment for each of the plurality of low priority bins with a trigger timestamp, such that a determination that the time allotment for one of the plurality of low priority bins exceeds the trigger timestamp results in an immediately following low priority bin to be rendered at the first quality.

9. The apparatus of claim 1, wherein to identify the one or more high priority bins of the plurality of bins, the at least one processing unit is configured to determine that a first bin of the plurality of bins overlaps with the fovea region, and
wherein to identify the plurality of low priority bins of the plurality of bins, the at least one processing unit is configured to determine that a second bin of the plurality of bins does not overlap with the fovea region.

10. The apparatus of claim 1, wherein to identify the plurality of low priority bins of the plurality of bins, the at least one processing unit is configured to determine which of the plurality of low priority bins can have a sacrificed quality.

11. The apparatus of claim 1, wherein for the bin-based rendering, the at least one processing unit is configured to perform one or more rendering passes to render the frame.

12. The apparatus of claim 1, wherein the apparatus comprises a wireless communication device.

13. A method for rendering graphics content, comprising:
receiving information indicative of a fovea region; and
rendering a frame using bin-based rendering by:
dividing the frame into a plurality of bins;
identifying, based on the information indicative of the fovea region, one or more high priority bins of the plurality of bins;
identifying, based on the information indicative of the fovea region, a plurality of low priority bins of the plurality of bins; and
rendering the one or more high priority bins before rendering the plurality of low priority bins;

prior to rendering a low priority bin of the plurality of low priority bins, determining a rendering time allotment for the frame;
determining whether the rendering time allotment for the frame will be exceeded between each of the plurality of low priority bins;
determining that the rendering time allotment for the frame will be exceeded based on an amount of time needed to render the one or more high priority bins and the plurality of low priority bins; and
rendering at least one of the plurality of low priority bins at a first quality instead of a second quality based on the determination that the rendering time allotment for the frame will be exceeded, wherein the first quality is lower than the second quality.

14. The method of claim 13, further comprising:
skipping rendering of at least one of the plurality of low priority bins based on the determination that the rendering time allotment for the frame will be exceeded; and
outputting one or more previously rendered bins from a previously rendered frame in place of the skipped at least one of the plurality of low priority bins.

15. The method of claim 14, wherein the one or more previously rendered bins are low priority bins.

16. The method of claim 13, wherein rendering the one or more high priority bins comprises rendering the one or more high priority bins at the second quality.

17. The method of claim 13, wherein rendering the at least one of the plurality of low priority bins at the first quality comprises:
dynamically adjusting foveation parameters to ensure that the frame is rendered to meet the rendering time allotment.

18. The method of claim 13, further comprising:
displaying a previously rendered frame in the place of a second frame based on a determination that a rendering time allotment for the second frame will be exceeded.

19. The method of claim 13, wherein determining the rendering time allotment for the frame is based on a quantity of primitives in a current bin being rendered, rendering time of a previous bin, or a pre-determined estimation.

20. The method of claim 13, wherein determining the rendering time allotment for the frame, comprises:
comparing a time allotment for each of the plurality of low priority bins with a trigger timestamp, such that a determination that the time allotment for one of the plurality of low priority bins exceeds the trigger timestamp results in an immediately following low priority bin to be rendered at the first quality.

21. The method of claim 13, wherein identifying the one or more high priority bins of the plurality of bins as high priority bins comprises determining that a first bin of the plurality of bins overlaps with the fovea region, and
wherein identifying the plurality of low priority bins of the plurality of bins comprises determining that a second bin of the plurality of bins does not overlap with the fovea region.

22. The method of claim 13, wherein identifying the plurality of low priority bins of the plurality of bins comprises determining which of the the plurality of low priority bins can have a sacrificed quality.

23. The method of claim 13, wherein the bin-based rendering comprises one or more rendering passes to render the frame.

24. A non-transitory computer-readable medium having code for rendering graphics content stored thereon that, when executed, causes a processing unit to:
receive information indicative of a fovea region; and
render a frame using bin-based rendering, wherein to render the frame using bin-based rendering the code further causes the processing unit to:
divide the frame into a plurality of bins;
identify, based on the information indicative of the fovea region, one or more high priority bins of the plurality of bins;
identify, based on the information indicative of the fovea region, a plurality of low priority bins of the plurality of bins; and
render the one or more high priority bins before the plurality of low priority bins are rendered;
prior to when a low priority bin of the plurality of low priority bins is rendered, determine a rendering time allotment for the frame;
determine whether the rendering time allotment for the frame will be exceeded between each of the plurality of low priority bins;
determine that the rendering time allotment for the frame will be exceeded based on an amount of time needed to render the one or more high priority bins and the plurality of low priority bins; and
render at least one of the plurality of low priority bins at a first quality instead of a second quality based on the determination that the rendering time allotment for the frame will be exceeded, wherein the first quality is lower than the second quality.

* * * * *